(12) United States Patent
Brady et al.

(10) Patent No.: US 10,960,880 B2
(45) Date of Patent: Mar. 30, 2021

(54) VEHICLE SLACK DISTRIBUTION

(71) Applicant: Intel Corporation, Santa Clara, CA (US)

(72) Inventors: Kevin Brady, Newry (GB); Jelle Sels, Dublin (IE); William Rafferty, Dublin (IE); Diarmaid O'Cualain, Galway (IE); Keyssy Guerra Perez, Dublin (IE)

(73) Assignee: INTEL CORPORATION, Santa Clara, CA (US)

( * ) Notice: Subject to any disclaimer, the term of this patent is extended or adjusted under 35 U.S.C. 154(b) by 268 days.

(21) Appl. No.: 15/937,931

(22) Filed: Mar. 28, 2018

(65) Prior Publication Data
US 2019/0047564 A1 Feb. 14, 2019

(51) Int. Cl.
| | | |
|---|---|---|
| B60W 30/16 | (2020.01) | |
| H04W 4/46 | (2018.01) | |
| B60W 50/08 | (2020.01) | |
| H04W 4/02 | (2018.01) | |

(52) U.S. Cl.
CPC ......... *B60W 30/162* (2013.01); *B60W 50/08* (2013.01); *H04W 4/023* (2013.01); *H04W 4/46* (2018.02); *B60W 2556/45* (2020.02); *B60W 2720/10* (2013.01); *B60W 2754/10* (2020.02)

(58) Field of Classification Search
None
See application file for complete search history.

(56) References Cited

U.S. PATENT DOCUMENTS

| | | |
|---|---|---|
| 2012/0083983 A1 | 4/2012 | Danz et al. |
| 2014/0343835 A1 | 11/2014 | Cooper et al. |
| 2015/0012204 A1 | 1/2015 | Breuer et al. |
| 2016/0019791 A1* | 1/2016 | Lin .................. G06K 9/325 |
| | | 382/105 |

FOREIGN PATENT DOCUMENTS

| | | |
|---|---|---|
| WO | 2014054937 A1 | 4/2014 |
| WO | 2017079349 A1 | 5/2017 |

OTHER PUBLICATIONS

International Search Report issued for corresponding application No. PCT/US2019/019924, dated Jun. 7, 2019, 18 pages (for informational purpose only).

* cited by examiner

*Primary Examiner* — Aniss Chad
*Assistant Examiner* — Kelly D Williams
(74) *Attorney, Agent, or Firm* — Viering, Jentschura & Partner MBB

(57) ABSTRACT

Herein is disclosed a slack distribution system comprising one or more sensors, configured to deliver sensor data to one or more processors in a first vehicle; a wireless communication circuit, configured to wirelessly transmit to a second vehicle; one or more processors, configured to determine from at least the sensor data, during first vehicle deceleration, a slack distance between the first vehicle and the second vehicle; and when the slack distance is less than a predetermined threshold, to cause the wireless communication circuit to transmit to the second vehicle a slack request message, wherein the slack request message is a request to change the slack distance.

20 Claims, 17 Drawing Sheets

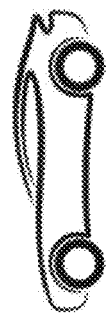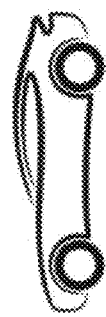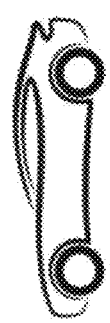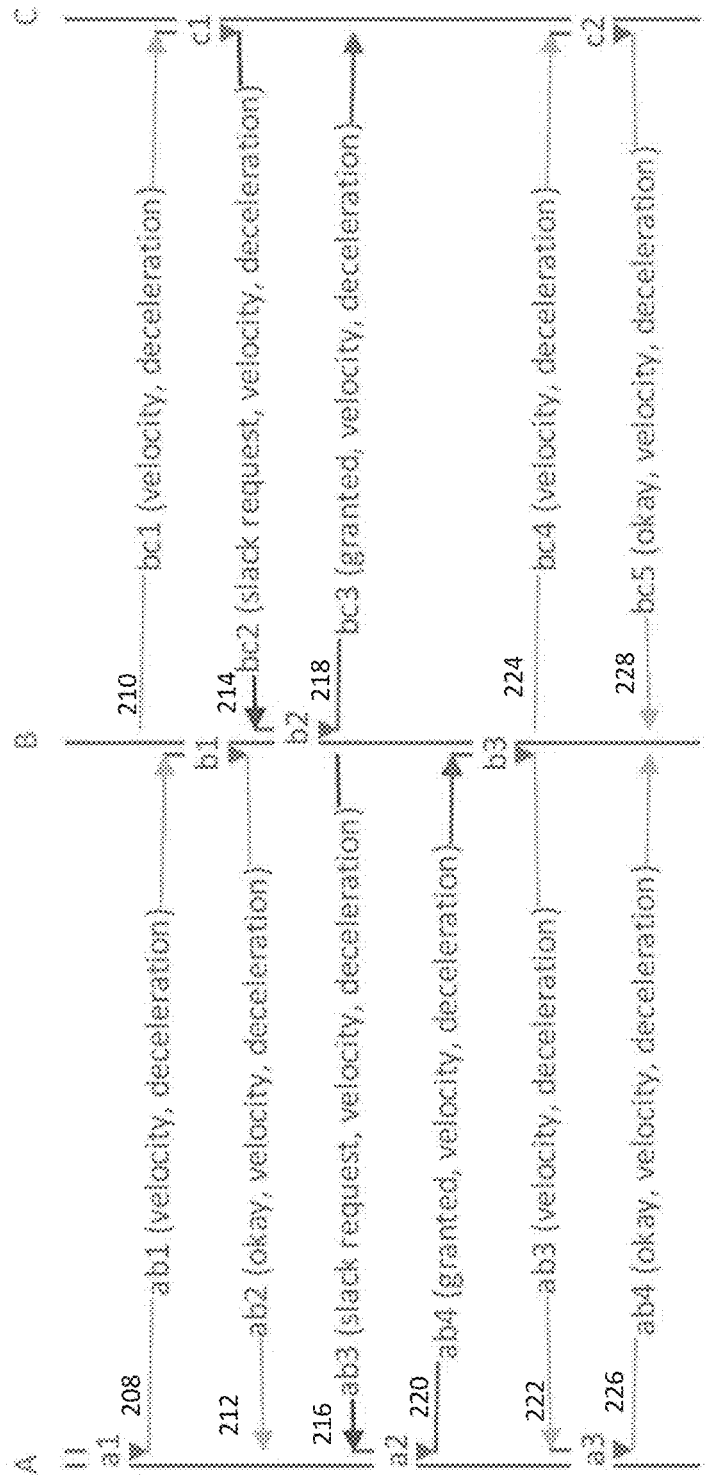
Fig. 2

| t | vA ms⁻¹ | a ms⁻² | dA m | vB ms⁻¹ | aB ms⁻² | dB m | vC ms⁻¹ | aC ms⁻² | dC m | dA to H m | dB to A m | dC to B (m) |
|---|---|---|---|---|---|---|---|---|---|---|---|---|
| 0.00 | 33.00 | 0.00 | 0.00 | 33.00 | 0.00 | 0.00 | 40.00 | 5.00 | 0.00 | 20.00 | 7.00 | 7.00 |
| 0.01 | 33.00 | 0.00 | 0.33 | 33.00 | 0.00 | 0.33 | 40.05 | 5.00 | 0.40 | 19.67 | 7.00 | 6.93 |
| 0.02 | 33.00 | 0.00 | 0.66 | 33.00 | 0.00 | 0.66 | 40.10 | 5.00 | 0.80 | 19.34 | 7.00 | 6.86 |
| 0.03 | 33.00 | 0.00 | 0.99 | 33.00 | 0.00 | 0.99 | 40.15 | 5.00 | 1.20 | 19.01 | 7.00 | 6.79 |
| 0.04 | 33.00 | 0.00 | 1.32 | 33.00 | 0.00 | 1.32 | 40.20 | 5.00 | 1.60 | 18.68 | 7.00 | 6.72 |
| 0.05 | 33.00 | -45.00 | 1.65 | 33.00 | 0.00 | 1.65 | 40.25 | 5.00 | 2.01 | 18.35 | 7.00 | 6.64 |
| 0.06 | 32.55 | -45.00 | 1.98 | 33.00 | 0.00 | 1.98 | 40.30 | 5.00 | 2.41 | 18.02 | 7.00 | 6.57 |
| 0.07 | 32.10 | -45.00 | 2.30 | 33.00 | 0.00 | 2.31 | 40.35 | 5.00 | 2.81 | 17.70 | 6.99 | 6.50 |
| 0.08 | 31.65 | -45.00 | 2.62 | 33.00 | 0.00 | 2.64 | 40.40 | 5.00 | 3.22 | 17.38 | 6.98 | 6.42 |
| 0.09 | 31.20 | -45.00 | 2.93 | 33.00 | 0.00 | 2.97 | 40.45 | 5.00 | 3.62 | 17.07 | 6.96 | 6.35 |
| 0.10 | 30.75 | -45.00 | 3.24 | 33.00 | 0.00 | 3.30 | 40.50 | 5.00 | 4.03 | 16.76 | 6.94 | 6.28 |
| 0.11 | 30.30 | -45.00 | 3.55 | 32.60 | -40.00 | 3.63 | 40.55 | 5.00 | 4.43 | 16.45 | 6.92 | 6.20 |
| 0.12 | 29.85 | -45.00 | 3.85 | 32.20 | -40.00 | 3.95 | 40.60 | 5.00 | 4.84 | 16.15 | 6.90 | 6.12 |
| 0.13 | 29.40 | -45.00 | 4.15 | 31.80 | -40.00 | 4.27 | 40.65 | 5.00 | 5.24 | 15.85 | 6.87 | 6.03 |
| 0.14 | 28.95 | -45.00 | 4.44 | 31.40 | -40.00 | 4.59 | 40.70 | 5.00 | 5.65 | 15.56 | 6.85 | 5.94 |
| 0.15 | 28.50 | -45.00 | 4.73 | 31.00 | -40.00 | 4.90 | 40.75 | -40.00 | 6.06 | 15.28 | 6.83 | 5.84 |
| 0.16 | 28.05 | -45.00 | 5.01 | 30.60 | -40.00 | 5.21 | 40.35 | -40.00 | 6.46 | 14.99 | 6.80 | 5.75 |
| 0.17 | 27.60 | -45.00 | 5.29 | 30.20 | -40.00 | 5.51 | 39.95 | -40.00 | 6.86 | 14.71 | 6.77 | 5.65 |
| 0.18 | 27.15 | -45.00 | 5.56 | 29.80 | -40.00 | 5.81 | 39.55 | -40.00 | 7.26 | 14.44 | 6.75 | 5.55 |
| 0.19 | 26.70 | -45.00 | 5.83 | 29.40 | -40.00 | 6.11 | 39.15 | -40.00 | 7.65 | 14.17 | 6.72 | 5.45 |
| 0.20 | 26.25 | -45.00 | 6.09 | 29.00 | -29.44 | 6.40 | 38.75 | -40.00 | 8.04 | 13.91 | 6.69 | 5.36 |
| 0.21 | 25.80 | -45.00 | 6.35 | 28.71 | -29.44 | 6.69 | 38.35 | -40.00 | 8.43 | 13.65 | 6.67 | 5.26 |
| 0.22 | 25.35 | -45.00 | 6.61 | 28.41 | -29.44 | 6.97 | 37.95 | -40.00 | 8.81 | 13.39 | 6.64 | 5.16 |
| 0.23 | 24.90 | -34.46 | 6.86 | 28.12 | -29.44 | 7.26 | 37.55 | -40.00 | 9.19 | 13.14 | 6.60 | 5.07 |
| 0.24 | 24.56 | -34.46 | 7.11 | 27.82 | -29.44 | 7.54 | 37.15 | -40.00 | 9.56 | 12.89 | 6.57 | 4.97 |
| 0.25 | 24.21 | -34.46 | 7.35 | 27.53 | -29.44 | 7.81 | 36.75 | -40.00 | 9.93 | 12.65 | 6.54 | 4.88 |
| 0.26 | 23.87 | -34.46 | 7.59 | 27.23 | -28.14 | 8.09 | 36.35 | -40.00 | 10.30 | 12.41 | 6.51 | 4.79 |
| 0.27 | 23.52 | -34.46 | 7.83 | 26.95 | -28.14 | 8.36 | 35.95 | -40.00 | 10.66 | 12.17 | 6.47 | 4.70 |

Fig. 15A

| | | | | | | | | | | | |
|---|---|---|---|---|---|---|---|---|---|---|---|
| 0.28 | 23.18 | -34.46 | 8.06 | 26.67 | -28.14 | 8.63 | 35.55 | -40.00 | 11.02 | 11.94 | 6.44 | 4.61 |
| 0.29 | 22.83 | -34.46 | 8.29 | 26.39 | -28.14 | 8.89 | 35.15 | -40.00 | 11.37 | 11.71 | 6.40 | 4.52 |
| 0.30 | 22.49 | -34.46 | 8.52 | 26.11 | -28.14 | 9.15 | 34.75 | -40.00 | 11.72 | 11.48 | 6.37 | 4.44 |
| 0.31 | 22.14 | -34.46 | 8.74 | 25.83 | -28.14 | 9.41 | 34.35 | -40.00 | 12.06 | 11.26 | 6.33 | 4.35 |
| 0.32 | 21.80 | -34.46 | 8.96 | 25.54 | -28.14 | 9.67 | 33.95 | -40.00 | 12.41 | 11.04 | 6.29 | 4.26 |
| 0.33 | 21.45 | -34.46 | 9.18 | 25.26 | -28.14 | 9.92 | 33.55 | -40.00 | 12.74 | 10.82 | 6.25 | 4.18 |
| 0.34 | 21.11 | -34.46 | 9.39 | 24.98 | -28.14 | 10.18 | 33.15 | -40.00 | 13.08 | 10.61 | 6.22 | 4.10 |
| 0.35 | 20.76 | -34.46 | 9.60 | 24.70 | -28.14 | 10.42 | 32.75 | -40.00 | 13.41 | 10.40 | 6.18 | 4.02 |
| 0.36 | 20.42 | -34.46 | 9.81 | 24.42 | -28.14 | 10.67 | 32.35 | -40.00 | 13.73 | 10.19 | 6.14 | 3.94 |
| 0.37 | 20.08 | -34.46 | 10.01 | 24.14 | -28.14 | 10.91 | 31.95 | -40.00 | 14.05 | 9.99 | 6.10 | 3.86 |
| 0.38 | 19.73 | -34.46 | 10.21 | 23.86 | -28.14 | 11.15 | 31.55 | -40.00 | 14.37 | 9.79 | 6.06 | 3.78 |
| 0.39 | 19.39 | -34.46 | 10.40 | 23.57 | -28.14 | 11.39 | 31.15 | -40.00 | 14.68 | 9.60 | 6.01 | 3.71 |
| 0.40 | 19.04 | -34.46 | 10.60 | 23.29 | -28.14 | 11.62 | 30.75 | -40.00 | 14.99 | 9.40 | 5.97 | 3.63 |
| 0.41 | 18.70 | -34.46 | 10.78 | 23.01 | -28.14 | 11.86 | 30.35 | -40.00 | 15.30 | 9.22 | 5.93 | 3.56 |
| 0.42 | 18.35 | -34.46 | 10.97 | 22.73 | -28.14 | 12.08 | 29.95 | -40.00 | 15.60 | 9.03 | 5.89 | 3.48 |
| 0.43 | 18.01 | -34.46 | 11.15 | 22.45 | -28.14 | 12.31 | 29.55 | -40.00 | 15.90 | 8.85 | 5.84 | 3.41 |
| 0.44 | 17.66 | -34.46 | 11.33 | 22.17 | -28.14 | 12.53 | 29.15 | -40.00 | 16.19 | 8.67 | 5.80 | 3.34 |
| 0.45 | 17.32 | -34.46 | 11.51 | 21.89 | -28.14 | 12.75 | 28.75 | -40.00 | 16.48 | 8.49 | 5.75 | 3.27 |
| 0.46 | 16.97 | -34.46 | 11.68 | 21.60 | -28.14 | 12.97 | 28.35 | -40.00 | 16.77 | 8.32 | 5.71 | 3.20 |
| 0.47 | 16.63 | -34.46 | 11.84 | 21.32 | -28.14 | 13.19 | 27.95 | -40.00 | 17.05 | 8.16 | 5.66 | 3.14 |
| 0.48 | 16.29 | -34.46 | 12.01 | 21.04 | -28.14 | 13.40 | 27.55 | -40.00 | 17.33 | 7.99 | 5.61 | 3.07 |
| 0.49 | 15.94 | -34.46 | 12.17 | 20.76 | -28.14 | 13.61 | 27.15 | -40.00 | 17.60 | 7.83 | 5.56 | 3.01 |
| 0.50 | 15.60 | -34.46 | 12.33 | 20.48 | -28.14 | 13.81 | 26.75 | -40.00 | 17.87 | 7.67 | 5.52 | 2.94 |
| 0.51 | 15.25 | -34.46 | 12.48 | 20.20 | -28.14 | 14.02 | 26.35 | -40.00 | 18.13 | 7.52 | 5.47 | 2.88 |
| 0.52 | 14.91 | -34.46 | 12.63 | 19.92 | -28.14 | 14.22 | 25.95 | -40.00 | 18.40 | 7.37 | 5.42 | 2.82 |
| 0.53 | 14.56 | -34.46 | 12.78 | 19.63 | -28.14 | 14.41 | 25.55 | -40.00 | 18.65 | 7.22 | 5.37 | 2.76 |
| 0.54 | 14.22 | -34.46 | 12.92 | 19.35 | -28.14 | 14.61 | 25.15 | -40.00 | 18.91 | 7.08 | 5.32 | 2.70 |
| 0.55 | 13.87 | -34.46 | 13.06 | 19.07 | -28.14 | 14.80 | 24.75 | -40.00 | 19.16 | 6.94 | 5.26 | 2.65 |
| 0.56 | 13.53 | -34.46 | 13.20 | 18.79 | -28.14 | 14.99 | 24.35 | -40.00 | 19.40 | 6.80 | 5.21 | 2.59 |
| 0.57 | 13.18 | -34.46 | 13.34 | 18.51 | -28.14 | 15.18 | 23.95 | -40.00 | 19.64 | 6.66 | 5.16 | 2.53 |

Fig. 15B

| | | | | | | | | | | | | |
|---|---|---|---|---|---|---|---|---|---|---|---|---|
| 0.58 | 12.84 | -34.46 | 13.47 | 18.23 | -28.14 | 15.36 | 23.55 | -40.00 | 19.88 | 6.53 | 5.10 | 2.48 |
| 0.59 | 12.49 | -34.46 | 13.59 | 17.95 | -28.14 | 15.54 | 23.15 | -40.00 | 20.11 | 6.41 | 5.05 | 2.43 |
| 0.60 | 12.15 | -34.46 | 13.72 | 17.66 | -28.14 | 15.72 | 22.75 | -40.00 | 20.34 | 6.28 | 5.00 | 2.38 |
| 0.61 | 11.81 | -34.46 | 13.83 | 17.38 | -28.14 | 15.89 | 22.35 | -40.00 | 20.57 | 6.17 | 4.94 | 2.33 |
| 0.62 | 11.46 | -34.46 | 13.95 | 17.10 | -28.14 | 16.07 | 21.95 | -40.00 | 20.79 | 6.05 | 4.88 | 2.28 |
| 0.63 | 11.12 | -34.46 | 14.06 | 16.82 | -28.14 | 16.24 | 21.55 | -40.00 | 21.01 | 5.94 | 4.83 | 2.23 |
| 0.64 | 10.77 | -34.46 | 14.17 | 16.54 | -28.14 | 16.40 | 21.15 | -40.00 | 21.22 | 5.83 | 4.77 | 2.18 |
| 0.65 | 10.43 | -34.46 | 14.28 | 16.26 | -28.14 | 16.57 | 20.75 | -40.00 | 21.43 | 5.72 | 4.71 | 2.14 |
| 0.66 | 10.08 | -34.46 | 14.38 | 15.98 | -28.14 | 16.73 | 20.35 | -40.00 | 21.64 | 5.62 | 4.65 | 2.09 |
| 0.67 | 9.74 | -34.46 | 14.48 | 15.69 | -28.14 | 16.89 | 19.95 | -40.00 | 21.84 | 5.52 | 4.59 | 2.05 |
| 0.68 | 9.39 | -34.46 | 14.58 | 15.41 | -28.14 | 17.04 | 19.55 | -40.00 | 22.04 | 5.42 | 4.53 | 2.01 |
| 0.69 | 9.05 | -34.46 | 14.67 | 15.13 | -28.14 | 17.20 | 19.15 | -40.00 | 22.23 | 5.33 | 4.47 | 1.97 |
| 0.70 | 8.70 | -34.46 | 14.76 | 14.85 | -28.14 | 17.35 | 18.75 | -40.00 | 22.42 | 5.24 | 4.41 | 1.93 |
| 0.71 | 8.36 | -34.46 | 14.84 | 14.57 | -28.14 | 17.49 | 18.35 | -40.00 | 22.60 | 5.16 | 4.35 | 1.89 |
| 0.72 | 8.01 | -34.46 | 14.93 | 14.29 | -28.14 | 17.64 | 17.95 | -40.00 | 22.79 | 5.07 | 4.29 | 1.85 |
| 0.73 | 7.67 | -34.46 | 15.00 | 14.01 | -28.14 | 17.78 | 17.55 | -40.00 | 22.96 | 5.00 | 4.23 | 1.82 |
| 0.74 | 7.33 | -34.46 | 15.08 | 13.72 | -28.14 | 17.92 | 17.15 | -40.00 | 23.14 | 4.92 | 4.16 | 1.78 |
| 0.75 | 6.98 | -34.46 | 15.15 | 13.44 | -28.14 | 18.05 | 16.75 | -40.00 | 23.31 | 4.85 | 4.10 | 1.75 |
| 0.76 | 6.64 | -34.46 | 15.22 | 13.16 | -28.14 | 18.19 | 16.35 | -40.00 | 23.47 | 4.78 | 4.03 | 1.71 |
| 0.77 | 6.29 | -34.46 | 15.28 | 12.88 | -28.14 | 18.32 | 15.95 | -40.00 | 23.63 | 4.72 | 3.97 | 1.68 |
| 0.78 | 5.95 | -34.46 | 15.34 | 12.60 | -28.14 | 18.44 | 15.55 | -40.00 | 23.79 | 4.66 | 3.90 | 1.65 |
| 0.79 | 5.60 | -34.46 | 15.40 | 12.32 | -28.14 | 18.57 | 15.15 | -40.00 | 23.94 | 4.60 | 3.83 | 1.62 |
| 0.80 | 5.26 | -34.46 | 15.46 | 12.04 | -28.14 | 18.69 | 14.75 | -40.00 | 24.09 | 4.54 | 3.77 | 1.60 |
| 0.81 | 4.91 | -34.46 | 15.51 | 11.75 | -28.14 | 18.81 | 14.35 | -40.00 | 24.24 | 4.49 | 3.70 | 1.57 |
| 0.82 | 4.57 | -34.46 | 15.55 | 11.47 | -28.14 | 18.92 | 13.95 | -40.00 | 24.38 | 4.45 | 3.63 | 1.54 |
| 0.83 | 4.22 | -34.46 | 15.60 | 11.19 | -28.14 | 19.04 | 13.55 | -40.00 | 24.52 | 4.40 | 3.56 | 1.52 |
| 0.84 | 3.88 | -34.46 | 15.64 | 10.91 | -28.14 | 19.15 | 13.15 | -40.00 | 24.65 | 4.36 | 3.49 | 1.50 |
| 0.85 | 3.53 | -34.46 | 15.68 | 10.63 | -28.14 | 19.26 | 12.75 | -40.00 | 24.78 | 4.32 | 3.42 | 1.48 |
| 0.86 | 3.19 | -34.46 | 15.71 | 10.35 | -28.14 | 19.36 | 12.35 | -40.00 | 24.91 | 4.29 | 3.35 | 1.45 |
| 0.87 | 2.85 | -34.46 | 15.74 | 10.07 | -28.14 | 19.46 | 11.95 | -40.00 | 25.03 | 4.26 | 3.28 | 1.44 |

Fig. 15C

| | | | | | | | | | | | |
|---|---|---|---|---|---|---|---|---|---|---|---|
| 0.88 | 2.50 | -34.46 | 15.77 | 9.78 | -28.14 | 19.56 | 11.55 | -40.00 | 25.15 | 4.23 | 3.20 | 1.42 |
| 0.89 | 2.16 | -34.46 | 15.79 | 9.50 | -28.14 | 19.66 | 11.15 | -40.00 | 25.26 | 4.21 | 3.13 | 1.40 |
| 0.90 | 1.81 | -34.46 | 15.81 | 9.22 | -28.14 | 19.75 | 10.75 | -40.00 | 25.37 | 4.19 | 3.06 | 1.38 |
| 0.91 | 1.47 | -34.46 | 15.83 | 8.94 | -28.14 | 19.84 | 10.35 | -40.00 | 25.47 | 4.17 | 2.98 | 1.37 |
| 0.92 | 1.12 | -34.46 | 15.84 | 8.66 | -28.14 | 19.93 | 9.95 | -40.00 | 25.58 | 4.16 | 2.91 | 1.36 |
| 0.93 | 0.78 | -34.46 | 15.85 | 8.38 | -28.14 | 20.02 | 9.55 | -40.00 | 25.67 | 4.15 | 2.83 | 1.34 |
| 0.94 | 0.43 | -34.46 | 15.85 | 8.10 | -28.14 | 20.10 | 9.15 | -40.00 | 25.77 | 4.15 | 2.76 | 1.33 |
| 0.95 | 0.09 | -34.46 | 15.86 | 7.81 | -28.14 | 20.18 | 8.75 | -40.00 | 25.86 | 4.14 | 2.68 | 1.32 |
| 0.96 | 0.00 | -34.46 | 15.86 | 7.53 | -28.14 | 20.26 | 8.35 | -40.00 | 25.94 | 4.14 | 2.60 | 1.31 |
| 0.97 | 0.00 | -34.46 | 15.86 | 7.25 | -28.14 | 20.33 | 7.95 | -40.00 | 26.02 | 4.14 | 2.53 | 1.31 |
| 0.98 | 0.00 | -34.46 | 15.86 | 6.97 | -28.14 | 20.40 | 7.55 | -40.00 | 26.10 | 4.14 | 2.46 | 1.30 |
| 0.99 | 0.00 | -34.46 | 15.86 | 6.69 | -28.14 | 20.47 | 7.15 | -40.00 | 26.17 | 4.14 | 2.39 | 1.29 |
| 1.00 | 0.00 | -34.46 | 15.86 | 6.41 | -28.14 | 20.53 | 6.75 | -40.00 | 26.24 | 4.14 | 2.32 | 1.29 |
| 1.01 | 0.00 | -34.46 | 15.86 | 6.13 | -28.14 | 20.60 | 6.35 | -40.00 | 26.31 | 4.14 | 2.26 | 1.29 |
| 1.02 | 0.00 | -34.46 | 15.86 | 5.84 | -28.14 | 20.66 | 5.95 | -40.00 | 26.37 | 4.14 | 2.20 | 1.29 |
| 1.03 | 0.00 | -34.46 | 15.86 | 5.56 | -28.14 | 20.71 | 5.55 | -40.00 | 26.43 | 4.14 | 2.14 | 1.29 |
| 1.04 | 0.00 | -34.46 | 15.86 | 5.28 | -28.14 | 20.77 | 5.15 | -40.00 | 26.48 | 4.14 | 2.09 | 1.29 |
| 1.05 | 0.00 | -34.46 | 15.86 | 5.00 | -28.14 | 20.82 | 4.75 | -40.00 | 26.53 | 4.14 | 2.04 | 1.29 |
| 1.06 | 0.00 | -34.46 | 15.86 | 4.72 | -28.14 | 20.87 | 4.35 | -40.00 | 26.58 | 4.14 | 1.99 | 1.29 |
| 1.07 | 0.00 | -34.46 | 15.86 | 4.44 | -28.14 | 20.91 | 3.95 | -40.00 | 26.62 | 4.14 | 1.94 | 1.30 |
| 1.08 | 0.00 | -34.46 | 15.86 | 4.16 | -28.14 | 20.96 | 3.55 | -40.00 | 26.66 | 4.14 | 1.90 | 1.30 |
| 1.09 | 0.00 | -34.46 | 15.86 | 3.87 | -28.14 | 21.00 | 3.15 | -40.00 | 26.69 | 4.14 | 1.86 | 1.31 |
| 1.10 | 0.00 | -34.46 | 15.86 | 3.59 | -28.14 | 21.03 | 2.75 | -40.00 | 26.72 | 4.14 | 1.82 | 1.32 |
| 1.11 | 0.00 | -34.46 | 15.86 | 3.31 | -28.14 | 21.07 | 2.35 | -40.00 | 26.74 | 4.14 | 1.79 | 1.32 |
| 1.12 | 0.00 | -34.46 | 15.86 | 3.03 | -28.14 | 21.10 | 1.95 | -40.00 | 26.77 | 4.14 | 1.76 | 1.33 |
| 1.13 | 0.00 | -34.46 | 15.86 | 2.75 | -28.14 | 21.13 | 1.55 | -40.00 | 26.78 | 4.14 | 1.73 | 1.35 |
| 1.14 | 0.00 | -34.46 | 15.86 | 2.47 | -28.14 | 21.16 | 1.15 | -40.00 | 26.80 | 4.14 | 1.70 | 1.36 |
| 1.15 | 0.00 | -34.46 | 15.86 | 2.19 | -28.14 | 21.18 | 0.75 | -40.00 | 26.81 | 4.14 | 1.68 | 1.37 |
| 1.16 | 0.00 | -34.46 | 15.86 | 1.90 | -28.14 | 21.20 | 0.35 | -40.00 | 26.81 | 4.14 | 1.66 | 1.39 |
| 1.17 | 0.00 | -34.46 | 15.86 | 1.62 | -28.14 | 21.22 | 0.00 | -40.00 | 26.81 | 4.14 | 1.64 | 1.40 |

Fig. 15D

| 1.18 | 0.00 | -34.46 | 15.86 | 1.34 | -28.14 | 21.23 | 0.00 | -40.00 | 26.81 | 4.14 | 1.63 | 1.42 |
|------|------|--------|-------|------|--------|-------|------|--------|-------|------|------|------|
| 1.19 | 0.00 | -34.46 | 15.86 | 1.06 | -28.14 | 21.24 | 0.00 | -40.00 | 26.81 | 4.14 | 1.61 | 1.43 |
| 1.20 | 0.00 | -34.46 | 15.86 | 0.78 | -28.14 | 21.25 | 0.00 | -40.00 | 26.81 | 4.14 | 1.60 | 1.44 |
| 1.21 | 0.00 | -34.46 | 15.86 | 0.50 | -28.14 | 21.26 | 0.00 | -40.00 | 26.81 | 4.14 | 1.60 | 1.45 |
| 1.22 | 0.00 | -34.46 | 15.86 | 0.22 | -28.14 | 21.26 | 0.00 | -40.00 | 26.81 | 4.14 | 1.59 | 1.45 |
| 1.23 | 0.00 | -34.46 | 15.86 | 0.00 | -28.14 | 21.26 | 0.00 | -40.00 | 26.81 | 4.14 | 1.59 | 1.45 |

VEHICLE SLACK DISTRIBUTION

TECHNICAL FIELD

Various aspects of the disclosure relate generally to the calculation and modification of slack between vehicles.

BACKGROUND

Where multiple vehicles traveling along a roadway must suddenly brake, many factors influence the success of collision avoidance attempts, as well as the resulting distance between vehicles upon coming to rest. In a line of vehicles following a deceleration, it is conceivable that, despite efforts at decelerating, one vehicle may collide with another. However, within the same line of vehicles, a nearby vehicle may come to rest with at least some distance between it and an adjacent vehicle.

SUMMARY

Herein is disclosed a slack distribution system comprising one or more sensors, configured to deliver sensor data to one or more processors in a first vehicle; a wireless communication circuit, configured to wirelessly transmit to a second vehicle; one or more processors, configured to determine from at least the sensor data, during first vehicle deceleration, a slack distance between the first vehicle and the second vehicle; and where the slack distance is less than a predetermined threshold, to cause the wireless communication circuit to transmit to the second vehicle a slack request message, wherein the slack request message is a request to change the slack distance.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure.

In the following description, some aspects of the disclosure are described with reference to the following drawings, in which:

FIG. 2 shows a communication sequence for slack distribution according to one aspect of the disclosure;

FIG. 15A shows page 1 of data demonstrating the elements of FIGS. 3-10, FIG. 15B shows page 2 of data demonstrating the elements of FIGS. 3-10;

FIG. 15C shows page 3 of data demonstrating the elements of FIGS. 3-10;

FIG. 15D shows page 4 of data demonstrating the elements of FIGS. 3-10; and

FIG. 15E shows page 5 of data demonstrating the elements of FIGS. 3-10.

DESCRIPTION

Figure 1:
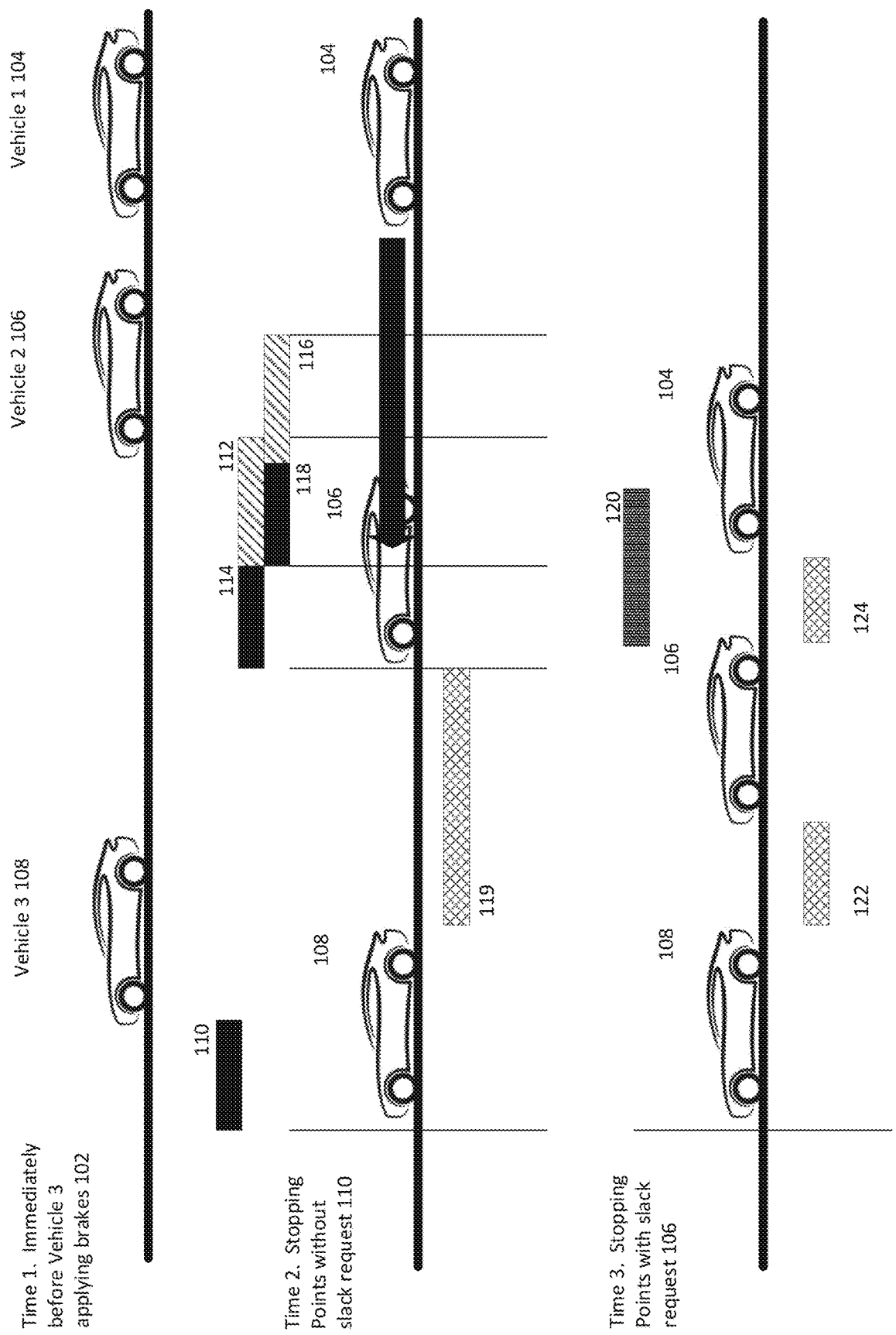
FIG. 1 shows a method of slack distribution.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration." Any aspect of the disclosure described herein as "exemplary" is not necessarily to be construed as preferred or advantageous over other aspects of the disclosure.

Throughout the drawings, it should be noted that like reference numbers are used to depict the same or similar elements, features, and structures.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "slack" may refer to an actual, determined, and/or predicted distance between a vehicle and an obstacle in front of the vehicle (whether another vehicle or a non-vehicle object) during deceleration. Slack may be a remaining distance, or a predicted distance, between vehicles after the vehicles have reached zero velocity, whether the distance is positive, zero, or negative. Slack may also be a remaining or predicted distance between vehicles after any period of deceleration, but while a velocity of one or more vehicles is greater than zero.

FIG. 1 depicts a vehicle slack distribution according to an aspect of the disclosure. This figure begins with time one 102 and depicts three vehicles, vehicle one 104, vehicle two 106, and vehicle three 108. Time one begins immediately before vehicle three applies its brakes for an emergency deceleration. Vehicle one 104, vehicle two 106, and vehicle three 108 are traveling on the same roadway and arranged generally within a single line. A comparatively small space exists between vehicle one 104 and vehicle two 106, and a comparatively large space exists between vehicle two 106 and vehicle three 108.

Time two 110 depicts a calculated stopping point following an emergency deceleration by vehicle three 108 and concomitant calculations of slack by vehicle two 106 and vehicle one 104. The minimum breaking distance is depicted by black bars, as shown by 110, 114, and 118. Driver reaction times are shown by diagonally shaded bars, as depicted in 112 and 116. A comparison of the position of vehicles 1, 2, and 3 between time one and time two shows that vehicle three begins braking in an area represented by the rightmost portion of 110 and comes to a stop at the leftmost portion at 110. Vehicle two 106 also begins braking, but vehicle two 106 must first see, appreciate, and respond to the braking activities of vehicle three 108. This period is known as a reaction time and is depicted by the shaded area 112. That is, at the rightmost area of shaded region 112, the braking actions of vehicle three 108 are visibly apparent to vehicle two 106, and the leftmost region of shaded region 112 depicts the point at which vehicle two 106 is able to respond to the braking of vehicle three 108 by beginning its own emergency deceleration. Vehicle two 106 brakes from the rightmost region of 114 to the leftmost region of 114, where vehicle two 106 comes to a stop. As is depicted in time to 110, vehicle two 106 and vehicle three 108 come to rest with sufficient room between them to avoid collision.

During the period of reaction time of vehicle two 106, which corresponds to shaded region 112, vehicle one 104 may not have any visible cue that emergency deceleration is required. That is, unless vehicle one 104 can see brake lights of vehicle three 108, vehicle one 104 will continue to travel forward until reaching the point at which vehicle two 106 begins braking. Upon the braking of vehicle two 106, vehicle one must see, appreciate, and respond to the braking of vehicle two 106. This is the reaction time of vehicle one 104, which is depicted as the shaded region 116. Thus, between vehicle one 104 and the rightmost portion of shaded region 116, vehicle one may have no cue or stimulus to respond; and from the rightmost portion of 116 to the leftmost portion of 116, vehicle one 104 must see, appreciate, and be able to respond to the braking of vehicle two 106. Upon completion of this reaction time, vehicle one begins to brake at the rightmost section of 118 until the leftmost section of 118. As is depicted, the leftmost section 118, which is the stopping point of vehicle one 104, occupies the same region as the stopped vehicle two 106. Thus, vehicle one 104 and vehicle two 106 would be expected to collide, while significant room between vehicle two 106 and vehicle three 108 would be expected. The slack between vehicle two and vehicle three at the conclusion of time two is depicted as 119. The slack between vehicle one and vehicle two is not depicted, as the slack is negative, as indicated by the overlaps between the end of vehicle three's minimum breaking distance 118 and the position of vehicle two. Given that there is significant slack between vehicle three and vehicle two, and that there is negative slack between vehicle one and vehicle two, distribution of slack between the vehicle may be advantageous.

Time point 3 106 shows a reconfiguration of the vehicles pursuant to a slack request message. In this case, vehicle one 104 determines that it will likely not stop with sufficient room to avoid a collision with vehicle two 106 and thus sends a slack request message to vehicle two 106. Vehicle two 106 determines the predicted distance between vehicle two 106 and vehicle three 108 upon coming to rest after braking, and calculating that the predicted distance is above a predetermined threshold, vehicle two 106 determines that the slack request message can be granted. Vehicle two 106 then reduces a braking force, such that vehicle two 106 comes to a stop closer to vehicle three 108 than would otherwise have been predicted. The braking force is reduced such that vehicle two 106 stops closer to vehicle three 108, but still with sufficient distance to avoid collision. Meanwhile, the increased proximity between vehicle two 106 and vehicle three 108 provides increased distance between vehicle two 106 and vehicle one 104. The result of the slack request message is demonstrated by shaded region 120, the right portion of which corresponds to the location where vehicle two 106 would have stopped without the slack request message, and the left portion of which corresponds to the location where vehicle two 106 stopped pursuant to the slack request message. The distributed slack, pursuant to vehicle one's slack request, is depicted by the cross-hatched patterns 122 and 124. Specifically, and pursuant to the slack request, the distributed slack between vehicle two 106 and vehicle three 108 is depicted as 122, which shows a reduction in slack from the slack depicted in 119. The slack between vehicle one 104 and vehicle two 106 is depicted as 124, which shows an increase in slack from the negative slack amount at Time 2.

FIG. 2 shows a slack request message communication between Vehicle A 206, Vehicle B 204, and Vehicle C 202. The vehicles are traveling in an approximate line along the same roadway. Vehicle A begins to brake and transmits a velocity and deceleration to Vehicle B 208. Vehicle B begins to brake and transmits a velocity and deceleration to vehicle C 210. Vehicle B also transmits and acknowledgement of the transmission from Vehicle A 208 along with the velocity and deceleration of Vehicle B 212. Vehicle C determines that it has insufficient slack between Vehicle C and vehicle B, and therefore Vehicle C transmits to vehicle B a slack request message 214, which may be accompanied by velocity and deceleration. Vehicle B 204 transmits the slack request message forward 216 to Vehicle A 206. Vehicle B calculates the available slack between Vehicle B and Vehicle A, and on the basis of this calculation transmits a grant of the slack request message 218 to vehicle C. Vehicle A calculates its own available slack, and on the basis of this calculation, transmits a grant of the slack request message 220 to Vehicle B 204. Vehicle B transmits its velocity and deceleration to Vehicle A 222, and Vehicle C transmits its velocity and deceleration to Vehicle B 224. Vehicle A transmits an acknowledgment, along with its own velocity and deceleration 226 to Vehicle B 204, and Vehicle C transmits an acknowledgment along with its velocity and deceleration 228 to Vehicle B 204.

Figure 3:
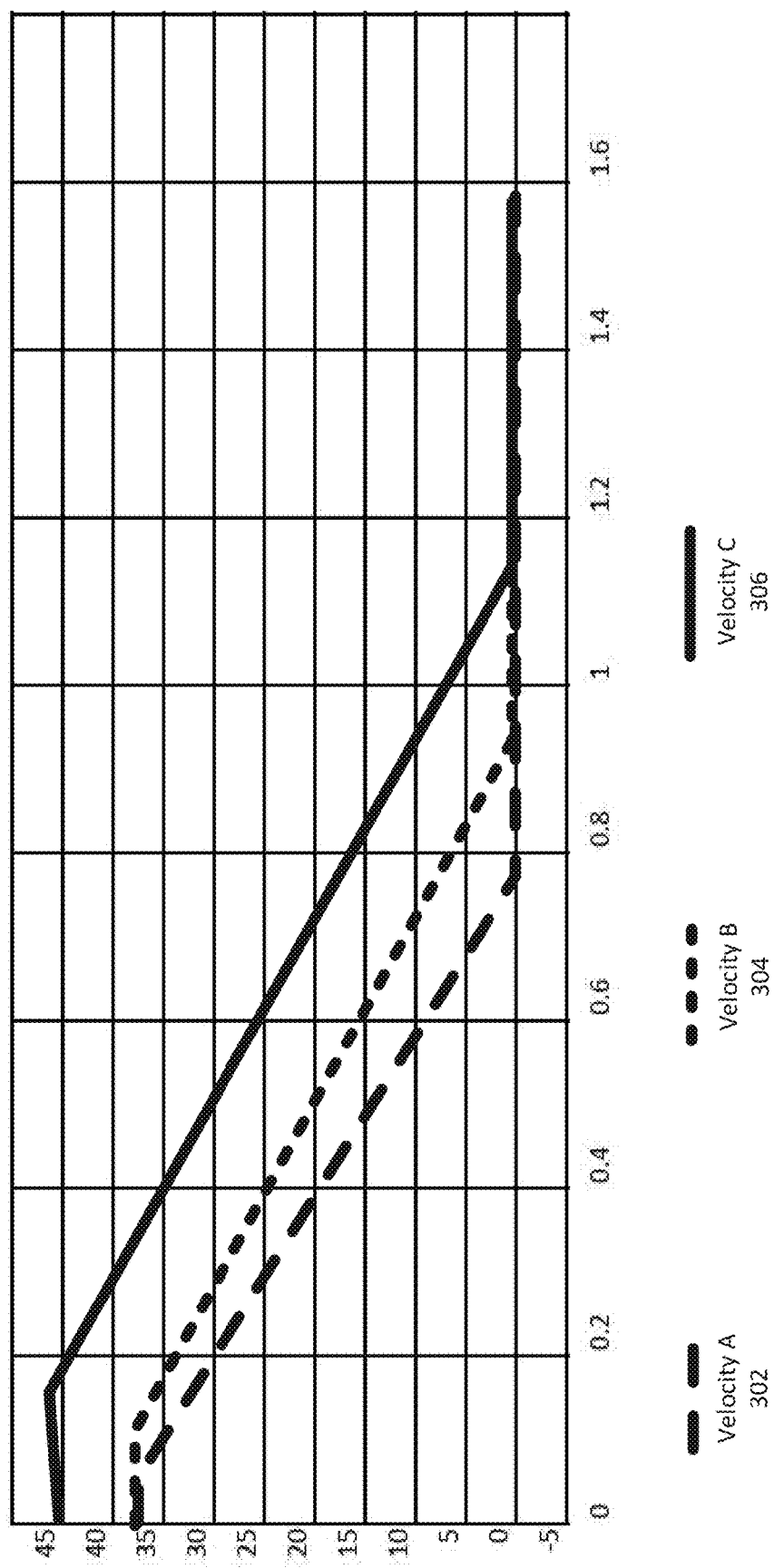
FIG. 3 shows predicted vehicle velocities over time in first deceleration situation.

FIG. 3 depicts velocities of Vehicle A 302, Vehicle B 304, and Vehicle C 306 over time. Being in the front, Vehicle A 302 begins to decelerate first, followed by Vehicle B 304, and Vehicle C 306. A difference in the initiation of deceleration may be explained at least in part by the required reaction time for each subsequent vehicle to appreciate and respond to a deceleration of a vehicle in front.

Figure 4:
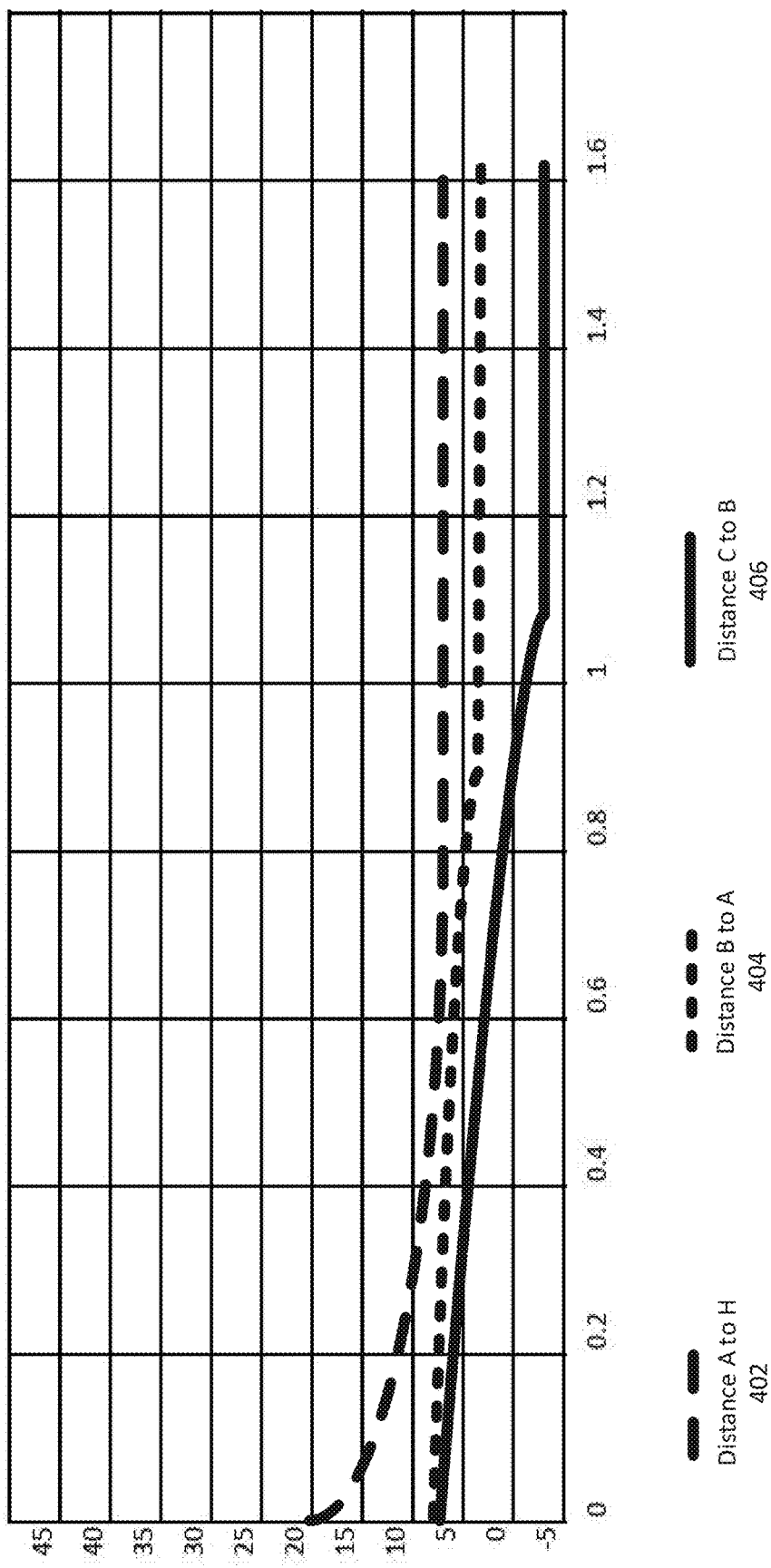
FIG. 4 shows predicted vehicle distances over time in first deceleration situation.

FIG. 4 depicts a distance between vehicles over time. The distance between Vehicle A and an obstacle in front of Vehicle A (the obstacle being referred to herein as H) is depicted as 402; the distance between Vehicle B and Vehicle A is depicted as 404; and the distance between Vehicle C and Vehicle B is depicted as 406. It can be seen from FIG. 4 that the distance between A and B always stays above zero (x-axis) and reaches a minimum value of 3.8 m (vehicle B's slack). Accordingly, Vehicle B acknowledges message ab1 (from FIG. 2) with an "okay" message, labelled "ab2" in FIG. 2. However, it can also be seen from FIG. 4 that the distance between B and C decreases to below zero 0.75 seconds after Vehicle A appreciates the hazard, and reaches a maximum negative value of 2.9 m. Therefore Vehicle C responds to message "bc1" with a "slack request message", message "bc2" in FIG. 2, requesting Vehicle B to give Vehicle C 2.9 m of slack before 0.75 seconds. Vehicle B calculates the necessary deceleration from that instant until the point represented at 0.75 seconds so that its total slack is increased by 2.9 m. The calculation, which is described in greater detail, infra, yields a quadratic equation, the solution of which is two values, one of which represents acceleration and one represents deceleration. In this case, the solution corresponding to deceleration is the desired solution. Vehicle B responds to message bc2 with a "granted" message, as in "bc3" in FIG. 2, and adjusts its deceleration. Vehicle B then recalculates how its distance from Vehicle A changes over time. It finds that if it gives Vehicle C 2.9 m of slack, the distance between itself and A reaches a new minimum value of 0.803 m.

Figure 5:
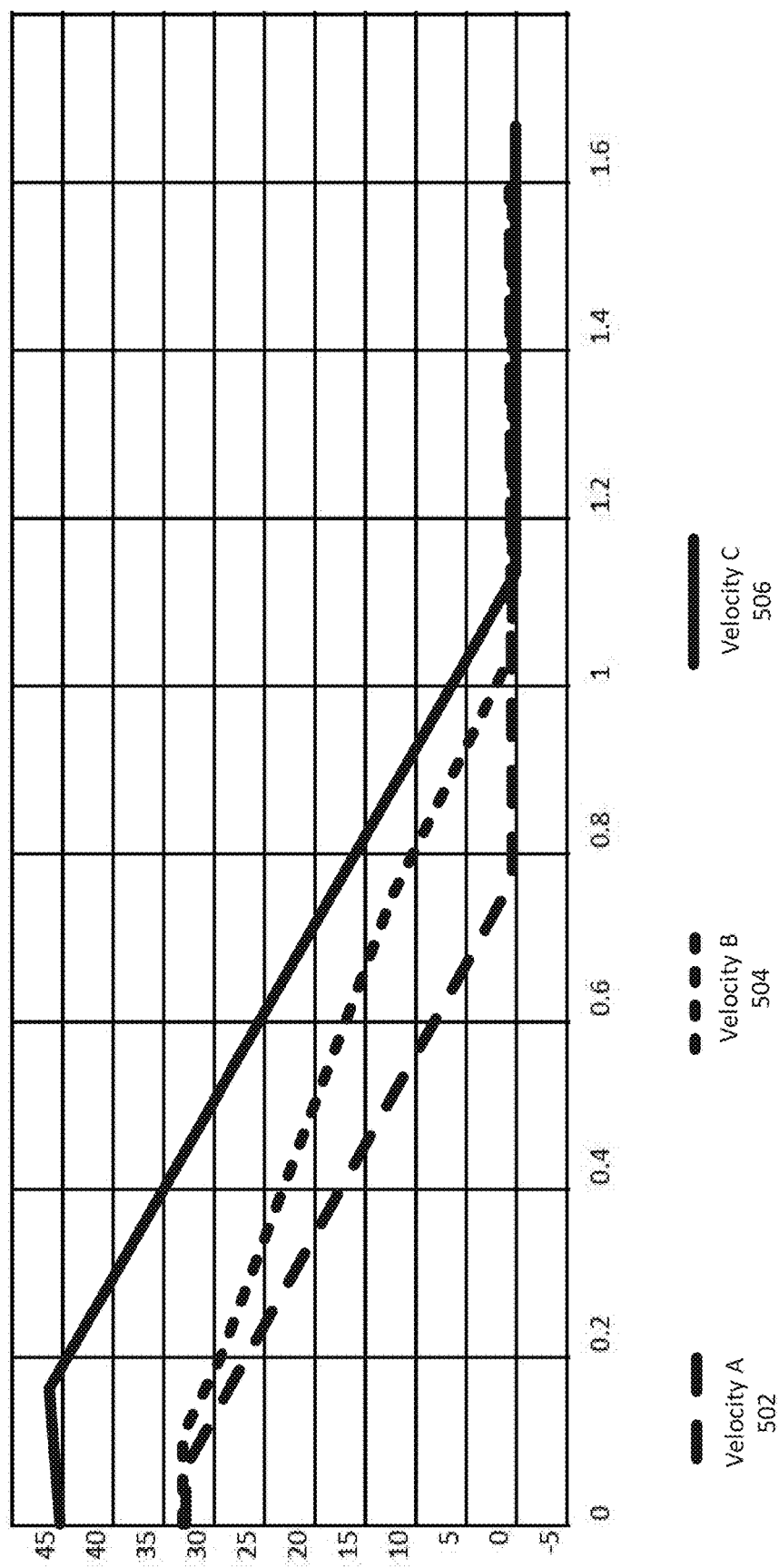
FIG. 5 shows predicted vehicle velocities over time in second deceleration situation.

FIG. 5 shows how the deceleration of Vehicle B changes in response to vehicle C's slack request message. The velocity of Vehicle A is depicted as 502. The velocity of Vehicle B is depicted as 504. The velocity of Vehicle C is depicted as 506.

Figure 6:
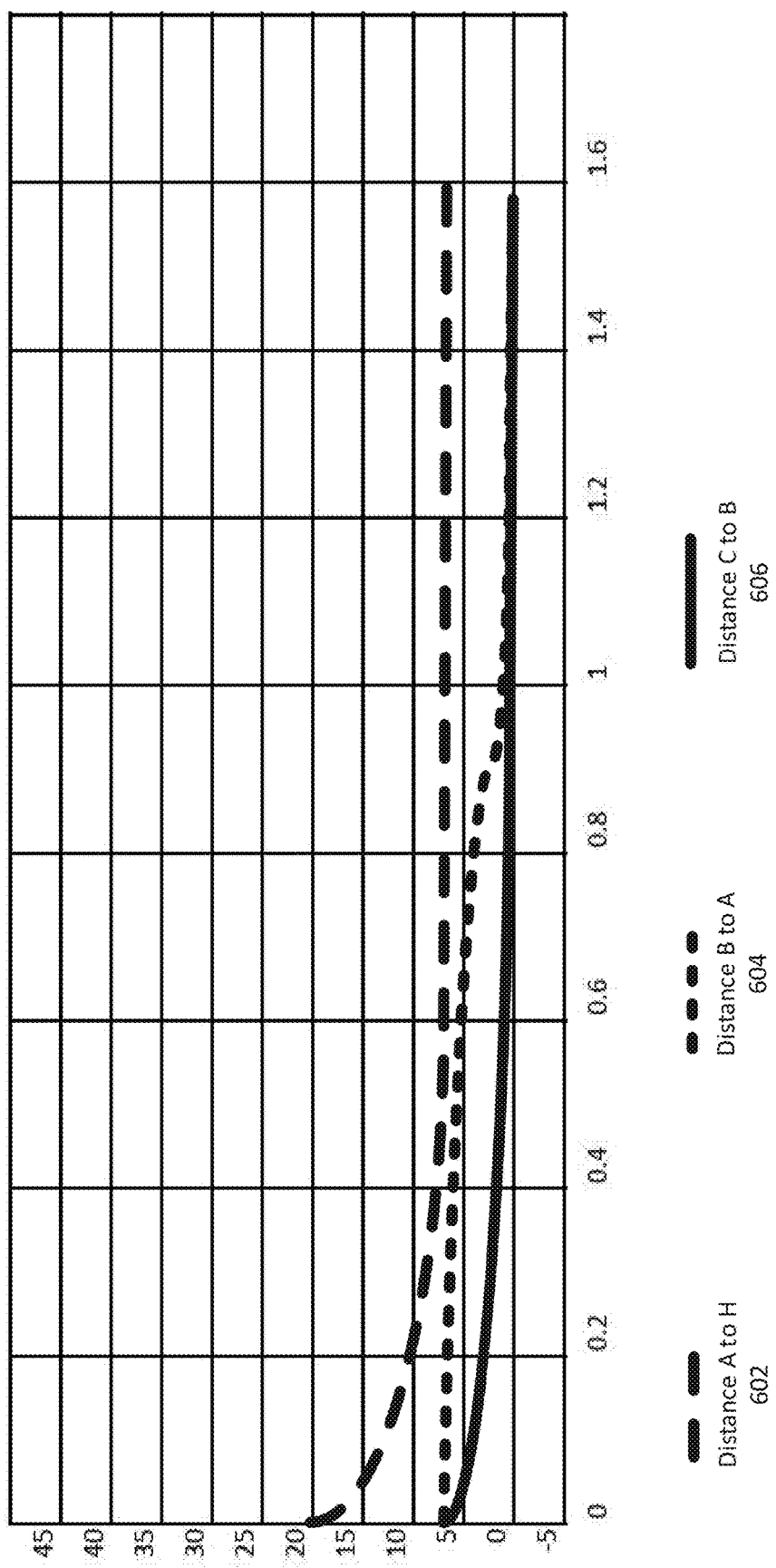
FIG. 6 shows predicted vehicle distances over time in second deceleration situation.

FIG. 6 shows how the distance between vehicles B and C is no longer negative, as a result of the slack request message. However, it can also be seen that the minimum distance between A and B and the minimum distance between B and C is close to zero. Although a crash has likely been avoided, there may be little tolerance for inaccuracies. Thus, Vehicle B sends a slack request message to vehicle A, "ab3" in FIG. 2, requesting 2 m of additional slack from vehicle A, but it sets a flag indicating that it is not currently in a collision scenario. Vehicle A calculates its deceleration needs from the current moment until reaching zero velocity. Based on this calculation, Vehicle A is able to give Vehicle B 2 m of additional slack, and recalculates how the distance between it and the hazard changes over time. The initial minimum distance between Vehicle A and the hazard is 6.25 m, so Vehicle A responds to message ab3 with a granted message, "bc4" in FIG. 2.

Figure 7:
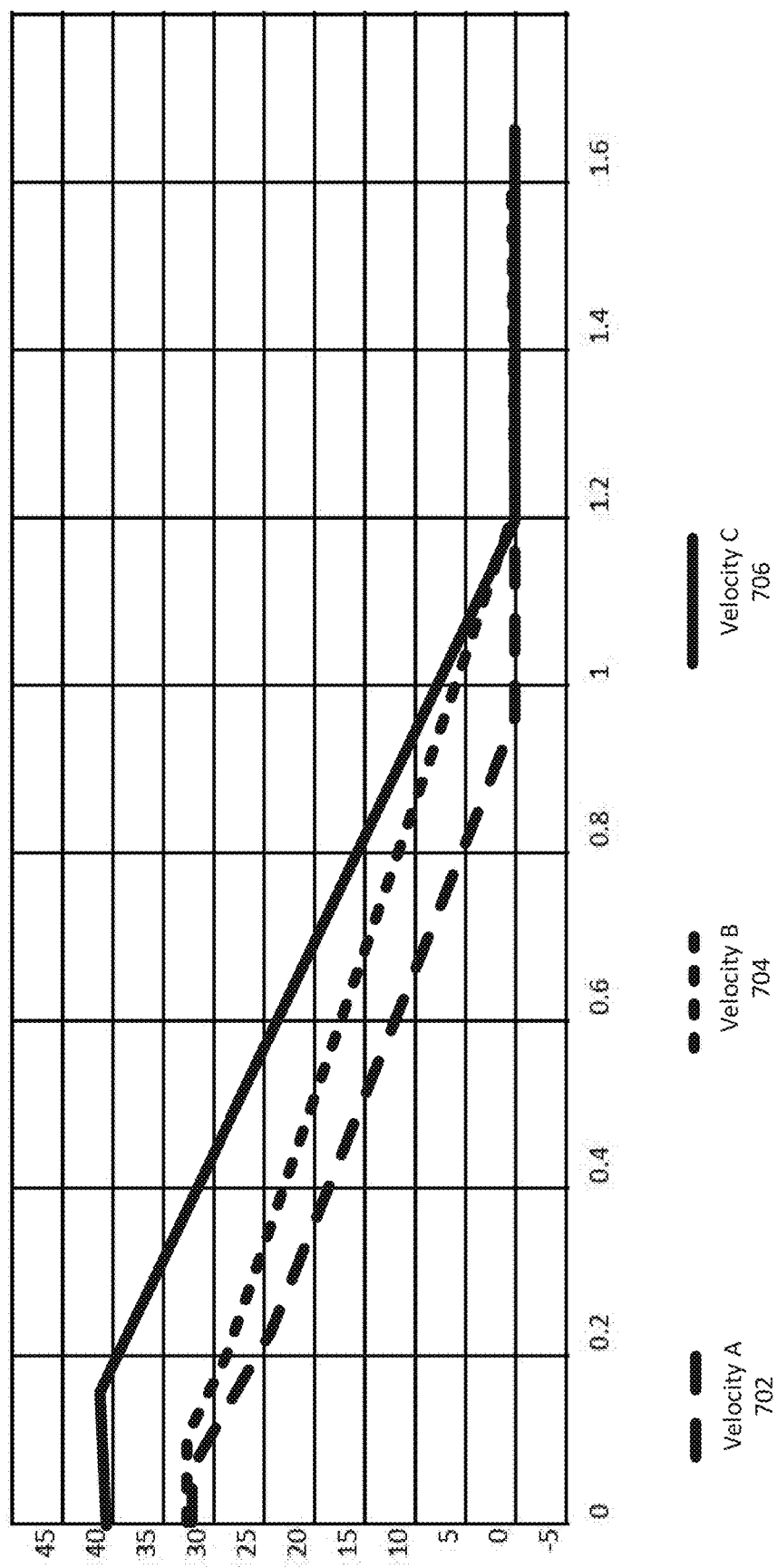
FIG. 7 shows predicted vehicle velocities over time in third deceleration situation.

FIG. 7 shows how the deceleration of Vehicle A changes in response to the slack request message from vehicle B. The velocity of Vehicle A is depicted as 702. The velocity of Vehicle B is depicted as 704. The velocity of Vehicle C is depicted as 706.

Figure 8:
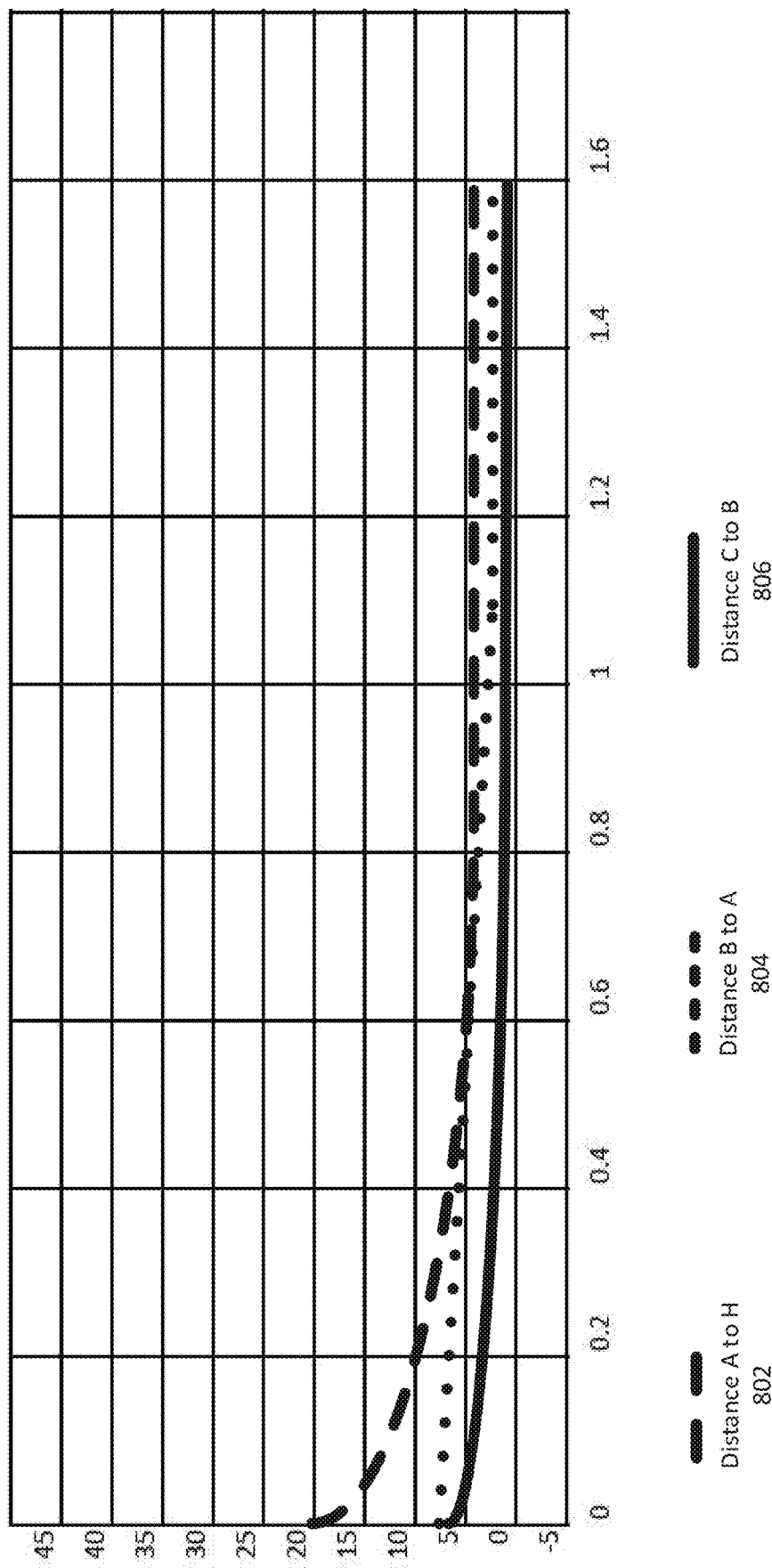
FIG. 8 shows predicted vehicle distances over time in third deceleration situation.

FIG. 8 shows how the minimum distance between vehicles A and B has now increased to 2.175 m and the minimum distance between Vehicle A and the hazard has now decreased to 4.143 m. Vehicle B now uses equation X again to calculate what its deceleration should be so that it is equidistant between vehicles A and C, increasing tolerance to any inaccuracies, and again recalculates how its velocity and the distance between it and vehicles A and C changes over time. Vehicle B sends a "velocity,deceleration" message to vehicle A, "ab3" in FIG. 1, and the same message to vehicle C, "bc4" in FIG. 2. Vehicles A and C respond to the messages with "okay" responses, "ab4" and "bc5" in FIG. 2.

Figure 9:
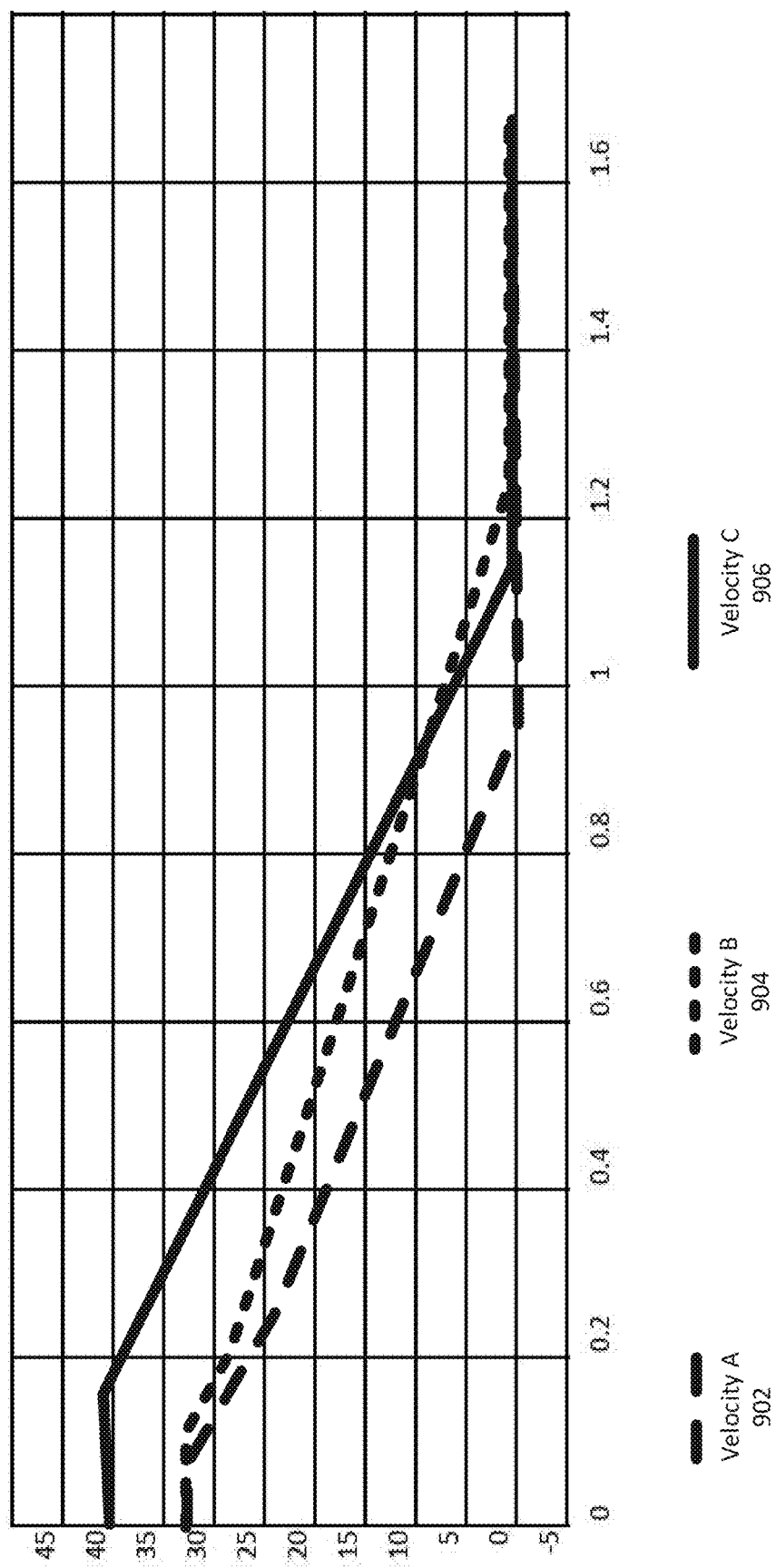
FIG. 9 shows predicted vehicle velocities over time in fourth deceleration situation.

FIG. 9 shows how the velocity of each vehicle changes over time, after all adjustments have been made to distribute slack.

Figure 10:
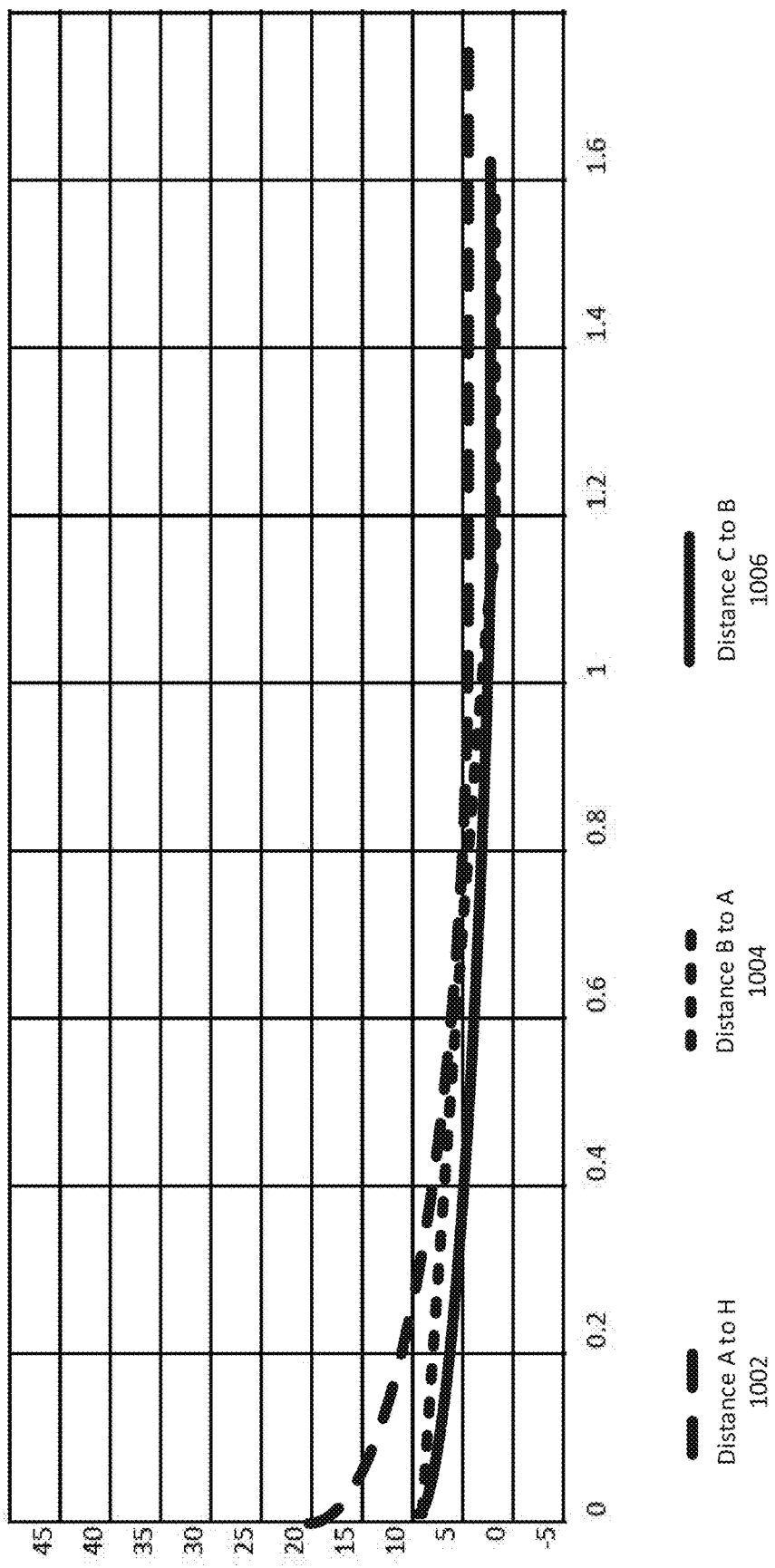
FIG. 10 shows predicted vehicle distances over time in fourth deceleration situation.

FIG. 10 shows that none of the vehicles will collide and that Vehicle B is equidistant between Vehicle A and vehicle C.

Figure 11:
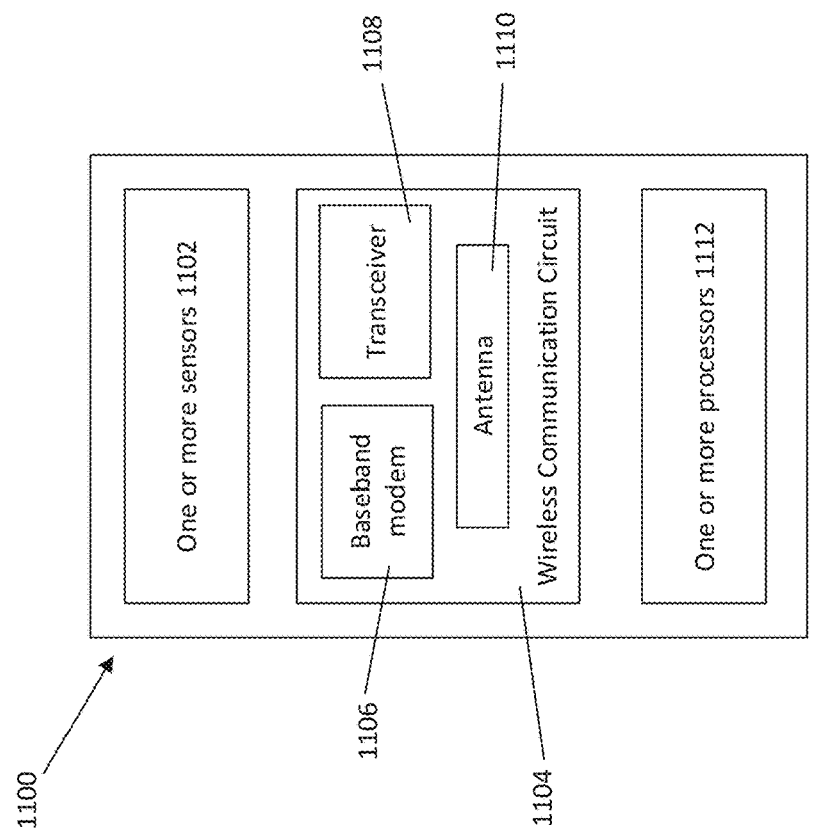
FIG. 11 shows a slack distribution system according to one aspect of the disclosure.

FIG. 11 shows a slack distribution system 1100, according to one aspect of the disclosure. Said slack distribution system may comprise one or more sensors 1102, configured to deliver sensor data to one or more processors in a first vehicle; a wireless communication circuit 1104, configured to wirelessly transmit to a second vehicle; one or more processors 1112, configured to determine from at least the sensor data, during first vehicle deceleration, a stopped distance between first vehicle and the second vehicle; and where the slack is less than a predetermined threshold, to cause the wireless communication circuit to transmit to the second vehicle a slack request message, wherein the slack request message is a request to change the distance. Wireless communication circuit 1104 may comprise a baseband modem 1106, configured to prepare a signal for wireless communication; a transceiver 1108, configured to send the signal for wireless communication; and an antenna, configured to transmit the signal for wireless communication 1110.

Figure 12:
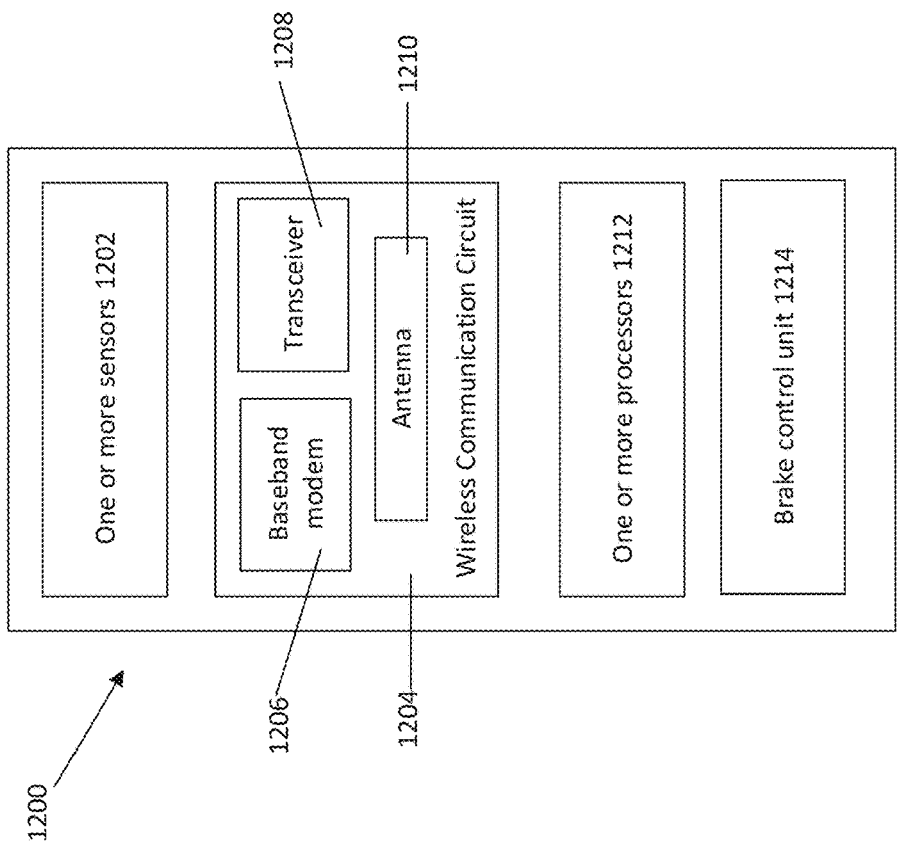
FIG. 12 shows a slack distribution system according to another aspect of the disclosure.

FIG. 12 shows a slack distribution system 1200, according to another aspect of the disclosure. Said slack distribution system may comprise a wireless communication circuit 1204, configured to wirelessly receive a slack request message from a first vehicle; one or more sensors 1202, configured to deliver sensor data to one or more processors in a second vehicle; a brake control unit 1214, configured to modify a braking force; and one or more processors 1212, configured to determine at least from the sensor data a slack of the second vehicle relative to an obstacle; and wherein the slack relative to the obstacle is greater than a predetermined threshold, to cause the brake control unit to modify the braking force to decrease a slack between the second vehicle and the obstacle. The wireless communication circuit 1204 may comprise a baseband modem 1206, configured to prepare a signal for wireless communication; a transceiver 1208, configured to send the signal for wireless communication; and an antenna, configured to transmit the signal for wireless communication 1210.

Figure 13:
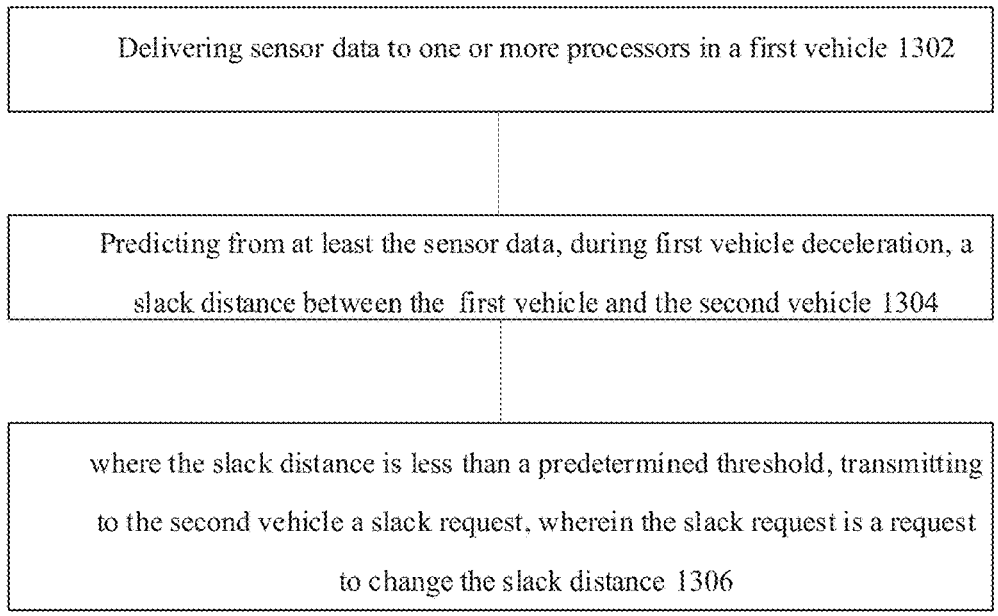
FIG. 13 shows a method of slack distribution according to one aspect of the disclosure.

FIG. 13 shows a method of slack distribution comprising delivering sensor data to one or more processors in a first vehicle 1302; determining from at least the sensor data, during first vehicle deceleration, a slack distance between the first vehicle and the second vehicle 1304; and where the slack distance is less than a predetermined threshold, transmitting to the second vehicle a slack request message, wherein the slack request message is a request to change the slack distance 1306.

Figure 14:
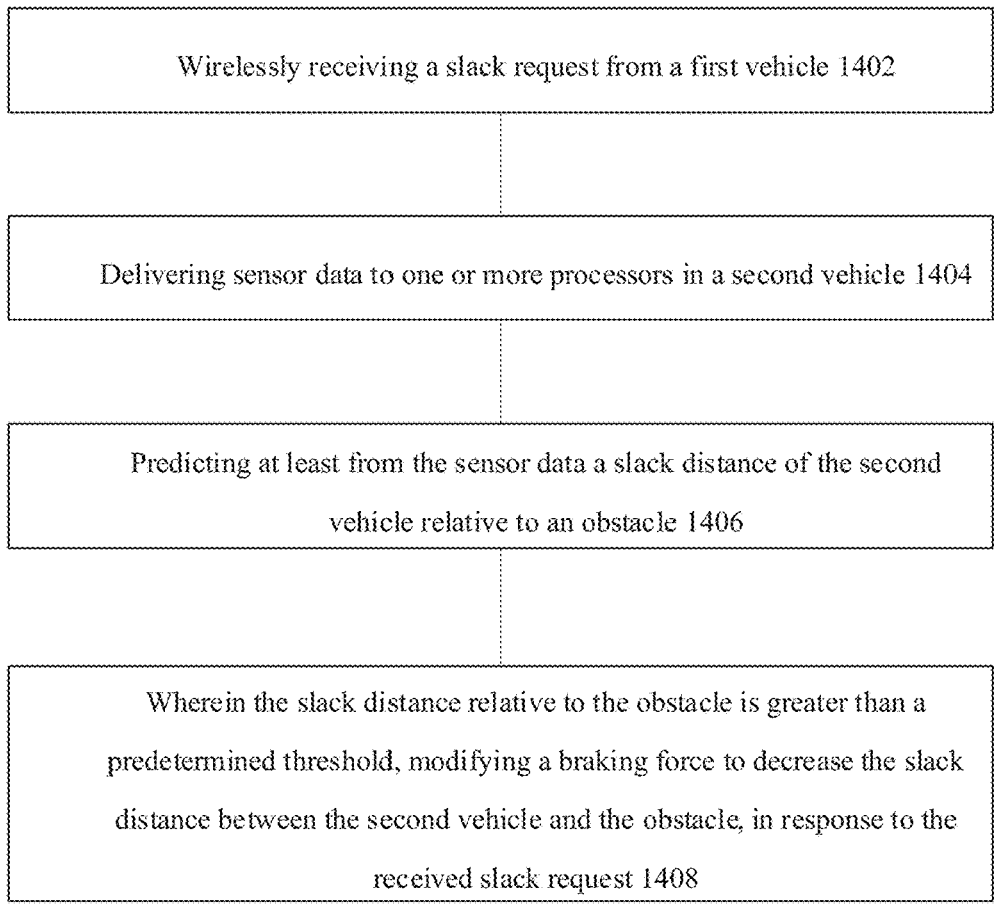
FIG. 14 shows a method of slack distribution according to one aspect of the disclosure.

FIG. 14 shows a method of slack distribution comprising wirelessly receiving a slack request message from a first vehicle 1402; delivering sensor data to one or more processors in a second vehicle 1404; determining at least from the sensor data a slack distance of the second vehicle relative to an obstacle 1406; and wherein the slack distance relative to the obstacle is greater than a predetermined threshold, modifying a braking force to decrease the slack distance between the second vehicle and the obstacle, in response to the received slack request message 1408.

According to one aspect of the disclosure, a vehicle may be equipped with a wireless communication device, which will enable the vehicle to communicate with a vehicle immediately in front and/or a vehicle immediately to the rear. The wireless communication may be a low latency link, which will allow rapid communication between vehicles. Such low latency link communication may be established, without limitation, by visual light communication, LTE, or 5G. Each vehicle may be equipped with one or more sensors that permits the measurement of the distance between the vehicle and an adjacent vehicle, such as the vehicle directly in front of the vehicle directly behind. Such measurements may be achieved by any means practicable including, but not limited to, stereo cameras, z-cameras, infrared cameras, sonar, lidar, radar, or any other method.

According to one aspect of the disclosure, one or more of the vehicles may operate according to the methods and procedures described herein, wherein the one or more vehicles lacks one or more sensors to measure a distance between the vehicle and an adjacent vehicle toward the front and/or toward the rear. This may be achieved, for instance, wherein one or more of the vehicles receives sensor data to calculate a distance between said vehicle and a vehicle in front, and also between said vehicle and a vehicle behind. By determining these distances, the vehicle is empowered to transmit the determined distance to a vehicle in front or behind, which may allow the methods and procedures described herein to function, even when said vehicle in front or behind does not comprise the requisite sensors to determine the distances as described herein.

In a circumstances when three vehicles, A, B, and C, are traveling along a roadway, and Vehicle A begins to brake due to an obstacle, each vehicle may communicate its current velocity and deceleration with one or more vehicles behind the vehicle using the low latency link. The receiving vehicle behind the transmitting vehicle will use the received velocity and deceleration, along with its own velocity, deceleration, and distance between the vehicle and the vehicle in front, to determine a braking distance of both vehicles. If it is determined that both vehicles will collide before the vehicles come to rest, the vehicle behind may request a braking distance slack from the vehicle in front. If the vehicle in front has sufficient slack, it will grant the request. The vehicle in front may also request slack from the vehicle in front of it. If sufficient slack is found among the vehicles in front of the vehicle issuing the slack request message, the vehicle issuing the slack request message will adjust the deceleration properly. If the slack cannot be granted, the vehicle issuing the slack request message will prepare for a collision.

A vehicle may be configured to calculate a distance between it and an adjacent vehicle, as the distance changes over time. This may be performed using $$v = u + at \qquad (1)$$

and $$s = ut + \frac{1}{2}at^2 \qquad (2)$$

wherein u is the initial velocity, v is the calculated velocity, a is the acceleration, s is the distance, and t is time. Using these calculations, it may be determined if the distance is ever less than or equal to zero, and at what time this will occur. This calculation can be performed by any vehicle. According to one aspect of the disclosure, Vehicle B performs these calculations regarding the distance between B and A and/or the distance between B and C. Similarly, Vehicle C may perform these calculations regarding the distance between C and B.

Upon calculating a distance during deceleration and/or at rest, it may be determined whether additional distance or slack between the vehicles is required. Such distance or slack may be requested via a slack request message. The slack request message may be transmitted to one or more vehicles. A slack request message received by any vehicle may be transmitted onward to a next vehicle.

The slack request message may be issued when a calculated distance between vehicles is any of a negative value, zero, or less than a predetermined threshold. A slack request message may include a requested slack distance. The distance may be a distance designed to alter the calculated distance such that a distance between vehicles becomes zero, becomes positive, or meets or exceeds a predetermined threshold. For example, the distance in a slack request message may be selected to cause a determined slack to change from negative to zero, from negative to positive, from negative to exceeding a predetermined threshold, from zero to positive, from zero to greater than a predetermined threshold, or from beneath a predetermined threshold to greater than or equal to a predetermined threshold.

When a slack request message with requested slack distance is received, the receiving vehicle may calculate a revised deceleration to accommodate the slack request message as follows:

$$S_{init} + S_{rqst} = u_1 t_1 + \frac{1}{2} a_1 t_1^2 - \left( \frac{u_1^2 + a_1^2 t_1^2 + 2 u_1 a_1 t_1}{2 a_2} \right) \quad (3)$$

In this equation, $s_{init}$ represents the vehicle's original calculated breaking distance; $s_{rqrst}$ represents the requested slack; $u_1$ represents the vehicles current velocity when performing the calculation; $t_1$ represents the time from when the calculation is being done to when the slack is needed; $a_2$ represents the vehicle's current deceleration (which it will return to after the slack has been distributed); and $a_1$ is what we are trying to calculate, the temporary decreased deceleration value.

The slack distribution system receives data from one or more sensors and uses said data to determine a slack distance between the vehicle and an additional vehicle. The additional vehicle may be a vehicle anterior or posterior to the vehicle. Notwithstanding any definition of slack herein, the slack distance may be understood as the distance between vehicles following a deceleration.

According to another aspect of the disclosure, the slack distance may be a remaining distance after two adjacent vehicles have come to a stop after deceleration. That is, when two vehicles began braking, it may be calculated based on at least the velocity, deceleration, and distance between vehicles, how much distance will be remaining at the conclusion of the deceleration. When this remaining distance, or slack distance, is negative, it is anticipated that the vehicles will collide. When the slack distance is zero, it is anticipated that the vehicles will come to a stop essentially adjacent to one another. When the slack distance is greater than zero, it is anticipated that the vehicles will come to a stop with a distance between them.

The determined slack may be compared to a predetermined threshold. When the determined slack is less than the predetermined threshold, the vehicle may be configured to transmit a slack request message to one or more adjacent vehicles. When the determined slack is greater than or equal to a predetermined threshold, this may suggest that sufficient slack is available, and no slack request message is necessary.

This procedure relies on communication between vehicles. The communication may be achieved by any means capable of providing low-latency communication between two or more vehicles. The low latency communication may be achieved via visual light communication, LTE, 5G, or otherwise. The wireless communication may be performed via a wireless communication circuit. Said wireless communication circuit may comprise a baseband modem, a transceiver, and an antenna. The wireless communication circuit may be configured to wirelessly transmit and receive communication between vehicles.

When a vehicle issues a slack request message, the slack request message may comprise a requested slack distance. The requested slack distance is a distance of additional slack desired by the vehicle. When a second vehicle receives a requested slack distance from a first vehicle, the second vehicle may assess the slack request message to determine whether sufficient slack is available to provide the first vehicle with the requested slack distance.

According to one aspect of the disclosure, the requested slack distance may be a difference between a determined slack and the predetermined threshold. That is, where the predetermined threshold is hypothetically set to 3 meters, and the determined slack is 1.2 meters, the requested slack distance may be 1.8 meters, such that the requested slack distance plus the determined slack equals at least the predetermined threshold.

According to another aspect of the disclosure, the requested slack distance may be a difference between a determined negative slack and zero. For example, where a determined slack is negative 2 meters, a vehicle may issue a slack request message including a requested slack distance of at least 2 meters, such that a grant of the requested slack distance will preclude or minimize a collision.

According to another aspect of the disclosure, the requested slack distance may be any distance, such that the determined slack plus the requested slack distance is at least 0.

According to another aspect of the disclosure, where a slack request message is denied due to insufficient slack in front of vehicle that issued the denial, a subsequent slack request message may be issued such that the combined determined slack and requested slack is less than 0. Although a collision would be likely to result under this circumstance, any resulting collision may be of diminished severity compared to a collision with only the determined slack amount.

The determination of slack may be triggered by a deceleration of one or more vehicles, including the first vehicle or the second vehicle. That is, a vehicle issuing the slack request message may be prompted to determine slack and, where insufficient slack is available, issue a slack request message, based on a deceleration of that vehicle. Moreover, a vehicle may be prompted to determine a slack amount and, where insufficient slack is available, issue a slack request message, based on braking of a second vehicle. The first vehicle may be prompted by braking of the second vehicle by the first vehicle's sensor detection of a braking mechanism of the second vehicle, or a transmission by the second vehicle that the second vehicle has begun braking.

According to another aspect of the disclosure, the determination of slack may be triggered by a sensor. That is, where a first vehicle senses that a second vehicle is braking, the first vehicle may be prompted to determine a slack between the first vehicle and the second vehicle. Said determination of slack may be performed when only the second vehicle is braking, or when the second and the first vehicle are braking. The sensor may perceive braking of the second vehicle through any means without limitation including, but not limited to, perception of brake lights, change in velocity, change in acceleration, or otherwise.

Determination of slack requires at least an ability to judge a distance between a first vehicle and a second vehicle, and as such, the first vehicle may rely on one or more sensors to obtain data necessary for slack determination. The one or more sensors may comprise, without limitation, at least one of a camera, a sonar sensor, a radar sensor, a lidar sensor, a navigation system, a speedometer, an accelerometer, or any combination of the foregoing. Moreover, rather than calculating this data, the first vehicle may request an adjacent vehicle to provide any data necessary for a first slack detection, and to transmit said data to the first vehicle for the first vehicle's determination of slack.

Determination of slack may involve calculation of a variety of factors. Factors involved in the calculation or determination of slack may include, but are not limited to, a velocity of the first vehicle; an acceleration or deceleration of the first vehicle; a velocity of the second vehicle; an acceleration or deceleration of the second vehicle, a distance between the first vehicle and the second vehicle; or any combination of the foregoing. The velocity, acceleration, or deceleration of the first vehicle may be an absolute velocity, acceleration, or deceleration, or a velocity, acceleration, or deceleration of the first vehicle relative to the second vehicle. Beyond this data, the slack determination may take into account other features that may influence braking ability or stopping time, such as, but not limited to a road friction coefficient, a brake friction coefficient, a braking force, a weather condition, or any combination of the foregoing, and to deliver same to the one or more processors.

Once a slack distance is determined, this distance is compared with a predetermined threshold and, where the predetermined threshold is not met, a slack request message is transmitted. Where the slack request message is accepted, the vehicle accepting the slack request message may adjust its deceleration to accommodate the slack request message. Adjustment of deceleration may be achieved by adjusting a braking force. The adjustment a braking force may be performed by any means whatsoever. The adjustment of a braking force may occur notwithstanding any input from the driver of the granting vehicle. That is, where a slack request message is granted, the braking force of said vehicle may be decreased, regardless of the actions of the driver. It is anticipated that certain emergency deceleration will not allow sufficient time for a driver of the vehicle to take action, and therefore the braking force must be adjusted independently of the driver's actions.

Wherein slack request message is granted, the granting vehicle may transmit an acceptance of the slack request message. The acceptance of the slack request message may be transmitted via any low-latency method whatsoever, including, but not limited to, the same method used to deliver the slack request message. Where the slack request message is denied, the denying vehicle may also transmit a denial of the slack request message. Similarly, the denial of the slack request message may be transmitted via any low-latency method whatsoever, including, but not limited to, the same method used to deliver the slack request message.

Where a requesting vehicle receives a denial of a slack request message, the requesting vehicle may reissue a slack request message, issue a modified slack request message, and/or prepare for a collision. Reissuing a slack request message may comprise resending an identical slack request message, whether to the same vehicle, a different vehicle, or a plurality of vehicles. Issuing a modified slack request message may comprise issuing a slack request message with a requested slack distance, where no requested slack distance was first issued, or issuing a slack request message with a modified requested slack distance. That is, where a first requested slack distance is a distance of x, the modified requested slack distance may comprise a distance less than x. Although an slack request message may be denied based on a lack of available slack corresponding to the requested slack distance, a modified requested slack distance may result in an accepted slack request message.

Where the vehicle prepares for collision, the vehicle may initiate any collision preparation actions including, but not limited to, loading an airbag, locking a seatbelt, moving a seat location, changing a seat configuration, or any combination thereof. The collision preparation actions may be actions designed to minimize damage to the vehicle in collision and/or to minimize injury to one or more passengers within the collision.

A vehicle receiving a slack request message may employ one or more sensors to evaluate an available slack distance, and to compare the evaluated slack distance to the requested additional slack distance, to determine whether the slack request message can be granted. Where available slack for the receiving vehicle is greater than the additional requested slack amount, the slack request message may be granted, and a slack request message grant may be transmitted to the requesting vehicle. Where the available slack is less than the requested additional slack distance, the slack request message cannot be granted, and a denial may be transmitted to the requesting vehicle.

Alternatively, rather than transmitting a denial, the vehicle receiving the slack request message may instead compare the determined available slack to a predetermined threshold, wherein the predetermined threshold is a minimum acceptable amount of slack. Where the available slack is above the predetermined threshold, the vehicle receiving the slack request message may transmit a modified acceptance of the slack request message, such that the receiving vehicle provides additional slack for the requesting vehicle, despite the additional slack being less than the requested amount.

Where a receiving vehicle grants a slack request message, whether in original slack request message or a modified slack request message, the receiving vehicle must adjust its deceleration to accommodate the slack request message. The receiving vehicle may use the formulas described herein to solve for a modified deceleration value, which will result in a slack distance corresponding at least to the slack request message grant.

The predetermined threshold, whether for a requesting vehicle or a receiving vehicle, may be understood as a minimum amount of acceptable slack. This may be a fixed amount, such as a number of meters or feet. This amount may be static, or it may be programmable, whether by the user or otherwise. Alternatively, the predetermined threshold may be a minimum amount of acceptable slack taking into account one or more driving conditions, such that the threshold is dynamic. Said driving conditions may include, but are not limited to, a vehicle velocity, a vehicle acceleration, a traffic condition, a road condition, and input from an external sensor, or any combination of the foregoing.

A slack request message may be sent to a vehicle in front, a vehicle behind, or a plurality of vehicles, whether in front, behind, or both. Any vehicle receiving a slack request message may forward the slack request message to any other vehicle. In permitting free forwarding of slack request messages, a maximum slack distribution may be achieved. That is, in a row of multiple cars traveling within one or more lanes, a slack request message from a vehicle may be forwarded several vehicles ahead, such that additional slack is provided in a backwards fashion, running from a providing vehicle to the requesting vehicle. Slack request message may be distributed in any manner congruent with the goal of improving slack distribution.

A slack request message may include a time for compliance with the slack request message. This may be based on a calculation of the vehicle issuing a slack request message of the time remaining until a remaining slack reaches zero, or, otherwise stated, until a collision is anticipated. The slack request message may include a time for compliance that includes a buffer, such that the time is shorter than a time at which a collision is anticipated. The time may be a duration, such as a number of milliseconds.

According to another aspect of the disclosure, the principles, methods, and devices of slack distribution disclosed herein may reduce a magnitude of deceleration. For a vehicle issuing a slack request, the redistribution of slack may result in collision avoidance. Since a collision involves a rapid deceleration, this may be considered a meaningful reduction in deceleration. Moreover, even where the requesting vehicle would not have collided with another vehicle absent a slack request, the slack distribution may permit the requesting vehicle additional distance to brake, thereby diminishing the deceleration needed. With respect to a vehicle granting a slack request, the vehicle's breaking distance is longer, which corresponds to a decreased deceleration. In these instances, the decreased deceleration may resulting in greater comfort and safety for the corresponding drivers.

Further, various embodiments will be described in the following.

In Example 1, a slack distribution system is disclosed comprising one or more sensors, configured to deliver sensor data to one or more processors in a first vehicle; a wireless communication circuit, configured to wirelessly transmit to a second vehicle; one or more processors, configured to determine from at least the sensor data, during first vehicle deceleration, a slack distance between the first vehicle and the second vehicle; and when the slack distance is less than a predetermined threshold, to cause the wireless communication circuit to transmit to the second vehicle a slack request message, wherein the slack request message is a request to change the slack distance.

In Example 2, the slack distribution system of Example 1 is disclosed, wherein the wireless communication circuit comprises a baseband modem, configured to prepare a signal for wireless communication; a transceiver, configured to send the signal for wireless communication; and an antenna, configured to transmit the signal for wireless communication.

In Example 3, the slack distribution system of Example 1 or 2 is disclosed, wherein the slack request message comprises a requested slack distance.

In Example 4, the slack distribution system of Example 3 is disclosed, wherein the requested slack distance is selected to cause the predicted slack to change from a negative value to zero, from a negative value to a positive value, from a negative value to a value equal to or greater than the predetermined threshold, from zero to a positive value, from zero to a value equal to or greater than the predetermined threshold, or from a value beneath the predetermined threshold to a value equal to or greater than the predetermined threshold.

In Example 5, the slack distribution system of any one of Examples 1 to 4 is disclosed, wherein the predetermined threshold is zero.

In Example 6, the slack distribution system of any one of Examples 1 to 4 is disclosed, wherein the predetermined threshold is a positive value.

In Example 7, the slack distribution system of any one of Examples 1 to 4 is disclosed, wherein the predetermined threshold is one meter.

In Example 8, the slack distribution system of any one of Examples 1 to 4 is disclosed, wherein the predetermined threshold is one to five meters.

In Example 9, the slack distribution system of any one of Examples 1 to 8 is disclosed, wherein the one or more processors are configured to trigger the determining of slack distance by at least one of a deceleration of the first vehicle, a deceleration of the second vehicle, a received transmission regarding a deceleration of a third vehicle, or any combination of the foregoing.

In Example 10, the slack distribution system of any one of Examples 1 to 8 is disclosed, wherein the one or more processors are configured to trigger the determining of slack distance by a signal received by a sensor.

In Example 11, the slack distribution system of any one of Examples 1 to 10 is disclosed, wherein the one or more sensors are located within the first vehicle.

In Example 12, the slack distribution system of any one of Examples 1 to 11 is disclosed, wherein at least one of the one or more sensors are located extravehicularly, and wherein data from the one or more extravehicular sensors is transmitted to the wireless communication circuit and delivered to the one or more processors.

In Example 13, the slack distribution system of any one of Examples 1 to 12 is disclosed, wherein the one or more sensors comprise at least one of a camera, a sonar sensor, a radar sensor, a lidar sensor, a navigation system, a speedometer, an accelerometer, or any combination of the foregoing.

In Example 14, the slack distribution system of any one of Examples 1 to 13 is disclosed, wherein the sensor data comprises a velocity of the first vehicle; an acceleration or deceleration of the first vehicle; a velocity of the second vehicle; an acceleration or deceleration of the second vehicle, a distance between the first vehicle and the second vehicle; or any combination of the foregoing.

In Example 15, the slack distribution system of Example 14 is disclosed, wherein the velocity, acceleration, or deceleration of the first vehicle is an absolute velocity, acceleration, or deceleration.

In Example 16, the slack distribution system of Example 14 is disclosed, wherein the velocity, acceleration, or deceleration of the first vehicle is a velocity, acceleration, or deceleration of the first vehicle relative to the second vehicle.

In Example 17, the slack distribution system of any one of Examples 14 to 16 is disclosed, wherein the velocity, acceleration, or deceleration of the second vehicle is an absolute velocity, acceleration, or deceleration.

In Example 18, the slack distribution system of any one of Examples 14 to 16 is disclosed, wherein the velocity, acceleration, or deceleration of the second vehicle is a velocity, acceleration, or deceleration of the second vehicle relative to the first vehicle.

In Example 19, the slack distribution system of any one of Examples 1 to 18 is disclosed, wherein the one or more sensors are further configured to receive data corresponding to at least one of a road friction coefficient, a brake friction coefficient, a braking force, a weather condition, or any combination of the foregoing, and to deliver the friction data to the one or more processors.

In Example 20, the slack distribution system of any one of Examples 1 to 19 is disclosed, wherein the one or more processors are further configured to determine the slack of the first vehicle relative to the second vehicle using at least the friction data.

In Example 21, the slack distribution system of any one of Examples 1 to 20 is disclosed, wherein the slack request message is a request for the second vehicle to modify a braking force to increase the slack between the first vehicle and the second vehicle.

In Example 22, the slack distribution system of any one of Examples 1 to 21 is disclosed, wherein the wireless communication circuit is configured to receive from the second vehicle an acceptance of the slack request message.

In Example 23, the slack distribution system of any one of Examples 1 to 22 is disclosed, wherein the wireless communication circuit is configured to receive from the second vehicle a denial of the slack request message.

In Example 24, the slack distribution system of any one of Examples 1 to 23 is disclosed, wherein the one or more processors are further configured to trigger one or more collision preparation measures when a denial of the slack request message is received.

In Example 25, the slack distribution system of Example 24 is disclosed, wherein the collision preparation measures comprise at least one of loading an airbag, locking a seatbelt, moving a seat location, changing a seat configuration, closing one or more windows, shutting off a fuel supply, placing a vehicle battery in safe mode, or any combination thereof.

In Example 26, a slack distribution system is disclosed, comprising a wireless communication circuit, configured to wirelessly receive a slack request message from a first vehicle; one or more sensors, configured to deliver sensor data to one or more processors in a second vehicle; a brake control unit, configured to modify a braking force; one or more processors, configured to determine at least from the sensor data a slack distance of the second vehicle relative to an obstacle; and when the slack distance relative to the obstacle is greater than a predetermined threshold, to cause the brake control unit to modify the braking force to decrease the slack distance between the second vehicle and the obstacle, in response to the received slack request message.

In Example 27, the slack distribution system of Example 26 is disclosed, wherein the wireless communication circuit comprises a baseband modem, configured to translate a signal for wireless communication; a transceiver, configured to send or receive the signal for wireless communication using and an antenna;

In Example 28, the slack distribution system of Example 26 or 27 is disclosed, wherein the received slack request message comprises a requested slack distance.

In Example 29, the slack distribution system of any one of Examples 26 to 28 is disclosed, wherein the one or more processors are configured to, when the slack distance relative to the obstacle is greater than the predetermined threshold, cause the wireless communication circuit to transmit to the first vehicle an acceptance of the slack request message.

In Example 30, the slack distribution system of any one of Examples 26 or 29 is disclosed, wherein the one or more processors are configured to, when the slack distance relative to the obstacle is less than the predetermined threshold, cause the wireless communication circuit to transmit a denial of the slack request message.

In Example 31, the slack distribution system of any one of Examples 26 to 30 is disclosed, wherein the obstacle is a third vehicle, anterior to the second vehicle, or a non-vehicle obstacle, anterior to the second vehicle.

In Example 32, the slack distribution system of Example 31 is disclosed, wherein the one or more processors are configured to, when the slack distance relative to the third vehicle is less than the predetermined threshold, cause the wireless communication unit to transmit to the third vehicle a slack request message.

In Example 33, the slack distribution system of any one of Examples 26 to 32 is disclosed, wherein the one or more processors are further configured to cause the wireless communication circuit to transmit a second slack request message to a third vehicle in response to the received slack request message from the first vehicle.

In Example 34, the slack distribution system of any one of Examples 26 to 33 is disclosed, wherein the predetermined threshold is zero.

In Example 35, the slack distribution system of any one of Examples 26 to 33 is disclosed, wherein the predetermined threshold is a positive value.

In Example 36, the slack distribution system of any one of Examples 26 to 33 is disclosed, wherein the predetermined threshold is one meter.

In Example 37, the slack distribution system of any one of Examples 26 to 33 is disclosed, wherein the predetermined threshold is one to five meters.

In Example 38, the slack distribution system of any one of Examples 26 to 37 is disclosed, wherein the one or more sensors comprise at least one of a camera, a sonar sensor, a radar sensor, a lidar sensor, a navigation system, a speedometer, an accelerometer, or any combination of the foregoing.

In Example 39, the slack distribution system of any one of Examples 26 to 38 is disclosed, wherein the sensor data comprises a velocity of the second vehicle; an acceleration or deceleration of the second vehicle; a velocity of the second vehicle; an acceleration or deceleration of the first vehicle, a distance between the first vehicle and the second vehicle; or any combination of the foregoing.

In Example 40, the slack distribution system of any one of Examples 26 to 39 is disclosed, wherein the one or more processors are further configured to trigger one or more collision preparation measures when the slack relative to the obstacle is less than the predetermined threshold.

In Example 41, the slack distribution system of Example 40 is disclosed, wherein the collision preparation measures comprise at least one of loading an airbag, locking a seatbelt, moving a seat location, changing a seat configuration, or any combination thereof.

In Example 42, the slack distribution system of any one of Examples 26 to 41 is disclosed, wherein the brake control unit is configured to modify the braking force to change the slack between the second vehicle and the obstacle to equal a predetermined threshold.

In Example 43, a slack distribution system is disclosed, comprising a first vehicle, the first vehicle comprising: one or more sensors, configured to deliver sensor data to one or more processors in the first vehicle; a wireless communication circuit, configured to wirelessly connect to a second vehicle; one or more processors, configured to determine from at least the sensor data, during first vehicle deceleration, a slack distance between first vehicle and the second vehicle; the second vehicle, the second vehicle comprising: a wireless communication circuit, configured to wirelessly receive a slack request message from a first vehicle; one or more sensors, configured to deliver sensor data to one or more processors in a second vehicle; a brake control unit, configured to modify a braking force; and one or more processors, configured to determine at least from the sensor data a slack distance of the second vehicle relative to an obstacle; when the determined slack between the first vehicle and the second vehicle is less than a predetermined threshold, the one or more processors of the first vehicle are further configured to cause the wireless communication circuit to transmit to the second vehicle a slack request message; and when the determined slack distance between the second vehicle and the obstacle is greater than a predetermined threshold, to cause the brake control unit to modify the braking force to decrease a slack distance between the second vehicle and the obstacle, in response to the slack request message.

In Example 44, a method of slack distribution is disclosed comprising determining from the sensor data, during first vehicle deceleration, a slack distance between a first vehicle and a second vehicle; and where the slack distance is less than a predetermined threshold, transmitting to the second vehicle a slack request message is disclosed, wherein the slack request message is a request to change the slack distance.

In Example 45, the method of slack distribution of Example 44 is disclosed, wherein the slack request message comprises an additional requested slack distance.

In Example 46, the method of slack distribution of Example 45 is disclosed, wherein the additional requested slack distance is selected to cause the determined slack to change from a negative value to zero, from a negative value to a positive value, from a negative value to a value equal to or greater than the predetermined threshold, from zero to a positive value, from zero to a value equal to or greater than the predetermined threshold, or from a value beneath the predetermined threshold to a value equal to or greater than the predetermined threshold.

In Example 47, the method of slack distribution of any one of Examples 44 to 46 is disclosed, wherein the predetermined threshold is zero.

In Example 48, the method of slack distribution of any one of Examples 44 to 46 is disclosed, wherein the predetermined threshold is a positive value.

In Example 49, the method of slack distribution of any one of Examples 44 to 46 is disclosed, wherein the predetermined threshold is one meter.

In Example 50, the method of slack distribution of any one of Examples 44 to 46 is disclosed, wherein the predetermined threshold is one to five meters.

In Example 51, the method of slack distribution of any one of Examples 44 to 50 is disclosed, wherein the determination of slack distance is triggered by at least one of a deceleration of the first vehicle, a deceleration of the second vehicle, a received transmission regarding a deceleration of a third vehicle, or any combination of the foregoing.

In Example 52, the method of slack distribution of any one of Examples 44 to 51 is disclosed, wherein the determination of slack distance is triggered by a signal received from a sensor.

In Example 53, the method of slack distribution of any one of Examples 44 to 52 is disclosed, wherein the second vehicle is a next vehicle in front of the first vehicle.

In Example 54, the method of slack distribution of any one of Examples 44 to 53 is disclosed, wherein the sensor data is provided by one or more sensors is disclosed, wherein the one or more sensors comprise at least one of a camera, a sonar sensor, a radar sensor, a lidar sensor, a navigation system, a speedometer, an accelerometer, or any combination of the foregoing.

In Example 55, the method of slack distribution of any one of Examples 44 to 54 is disclosed, wherein the sensor data comprises a velocity of the first vehicle; an acceleration or deceleration of the first vehicle; a velocity of the second vehicle; an acceleration or deceleration of the second vehicle, a distance between the first vehicle and the second vehicle; or any combination of the foregoing.

In Example 56, the method of slack distribution of Example 55 is disclosed, wherein the velocity, acceleration, or deceleration of the first vehicle is an absolute velocity, acceleration, or deceleration.

In Example 57, the method of slack distribution of Example 55 is disclosed, wherein the velocity, acceleration, or deceleration of the first vehicle is a velocity, acceleration, or deceleration of the first vehicle relative to the second vehicle.

In Example 58, the method of slack distribution of any one of Examples 55 to 57 is disclosed, wherein the velocity, acceleration, or deceleration of the second vehicle is an absolute velocity, acceleration, or deceleration.

In Example 59, the method of slack distribution of any one of Examples 55 to 58 is disclosed, wherein the velocity, acceleration, or deceleration of the second vehicle is a velocity, acceleration, or deceleration of the second vehicle relative to the first vehicle.

In Example 60, the method of slack distribution of any one of Examples 44 to 59 is disclosed, wherein the slack distance is determined using at least one of a road friction coefficient, a brake friction coefficient, a braking force, a weather condition, or any combination of the foregoing, and to deliver same to the one or more processors.

In Example 61, the method of slack distribution of Example 60 is disclosed, further comprising determining the slack of the first vehicle relative to the second vehicle using at least the friction data.

In Example 62, the method of slack distribution of any one of Examples 44 to 61 is disclosed, wherein the slack request message is a request for the second vehicle to modify a braking force to increase the slack between the first vehicle and the second vehicle.

In Example 63, the method of slack distribution of any one of Examples 44 to 62 is disclosed, further comprising receiving from the second vehicle an acceptance of the slack request message.

In Example 64, the method of slack distribution of any one of Examples 44 to 63 is disclosed, further comprising receiving from the second vehicle a denial of the slack request message.

In Example 65, the method of slack distribution of any one of Examples 44 to 64 is disclosed, further comprising triggering one or more collision preparation measures when a denial of the slack request message is received.

In Example 66, the method of slack distribution of Example 65 is disclosed, wherein the collision preparation measures comprise at least one of loading an airbag, locking a seatbelt, moving a seat location, changing a seat configuration, or any combination thereof.

In Example 67, a method of slack distribution is disclosed, comprising wirelessly receiving in a second vehicle a slack request message from a first vehicle; determining at least from the sensor data a slack distance of the second vehicle relative to an obstacle; and wherein the slack distance relative to the obstacle is greater than a predetermined threshold, modifying a braking force to decrease the slack distance between the second vehicle and the obstacle, in response to the received slack request message.

In Example 68, the method of slack distribution of Example 67 is disclosed, wherein the received slack request message comprises an additional requested slack distance.

In Example 69, the method of slack distribution of Example 67 or 68 is disclosed, further comprising is disclosed, wherein the slack distance relative to the obstacle is greater than the predetermined threshold, transmitting to the first vehicle an acceptance of the slack request message.

In Example 70, the method of slack distribution of any one of Examples 67 to 69 is disclosed, further comprising is disclosed, wherein the slack distance relative to the obstacle is less than the predetermined threshold, transmitting a denial of the slack request message.

In Example 71, the method of slack distribution of any one of Examples 67 to 70 is disclosed, wherein the obstacle is a third vehicle, anterior to the second vehicle.

In Example 72, the method of slack distribution of Example 71 is disclosed, further comprising is disclosed, wherein the slack distance relative to the third vehicle is less than the predetermined threshold, transmitting to the third vehicle a slack request message.

In Example 73, the method of slack distribution of any one of Examples 67 to 72 is disclosed, further comprising transmitting a second slack request message to a third vehicle in response to the received slack request message from the first vehicle.

In Example 74, the method of slack distribution of any one of Examples 67 to 73 is disclosed, wherein the predetermined threshold is zero.

In Example 75, the method of slack distribution of any one of Examples 67 to 73 is disclosed, wherein the predetermined threshold is a positive value.

In Example 76, the method of slack distribution of any one of Examples 67 to 73 is disclosed, wherein the predetermined threshold is one meter.

In Example 77, the method of slack distribution of any one of Examples 67 to 73 is disclosed, wherein the predetermined threshold is one to five meters.

In Example 78, the method of slack distribution of any one of Examples 67 to 77 is disclosed, wherein the sensor data is received from at least one of a camera, a sonar sensor, a radar sensor, a lidar sensor, a navigation system, a speedometer, an accelerometer, or any combination of the foregoing.

In Example 79, the method of slack distribution of any one of Examples 67 to 78 is disclosed, wherein the sensor data comprises a velocity of the second vehicle; an acceleration or deceleration of the second vehicle; a velocity of the second vehicle; an acceleration or deceleration of the first vehicle, a distance between the first vehicle and the second vehicle; or any combination of the foregoing.

In Example 80, the method of slack distribution of any one of Examples 67 to 79 is disclosed, further comprising triggering one or more collision preparation measures when the slack relative to the obstacle is less than the predetermined threshold.

In Example 81, the method of slack distribution of Example 80 is disclosed, wherein the collision preparation measures comprise at least one of loading an airbag, locking a seatbelt, moving a seat location, changing a seat configuration, or any combination thereof.

In Example 82, the method of slack distribution of any one of Examples 67 to 81 is disclosed, further comprising modifying the braking force to change the slack between the second vehicle and the obstacle to equal a predetermined threshold.

In Example 83, a method of slack distribution is disclosed, comprising delivering sensor data to one or more processors in a first vehicle; determining from at least the delivered sensor data, during first vehicle deceleration, a slack distance between a first vehicle and the second vehicle; when the determined slack distance between the first vehicle and the second vehicle is less than a predetermined threshold, transmitting to the second vehicle a slack request message; delivering sensor data to one or more processors in a second vehicle; determining, at least from the sensor data, a slack distance of the second vehicle relative to an obstacle; and when the determined slack distance between the second vehicle and the obstacle is greater than a predetermined threshold, modifying a braking force to decrease a slack distance between the second vehicle and the obstacle, in response to the slack request message.

In Example 84, the slack distribution system of Example 10 is disclosed, wherein the signal received from the sensor is a malfunction signal.

In Example 85, the method of slack distribution of Example 51 is disclosed, wherein the signal received from the sensor is a malfunction signal.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A slack distribution system comprising:
   one or more sensors, configured to deliver sensor data to one or more processors in a first vehicle;
   a wireless communication circuit, configured to wirelessly transmit to a second vehicle, wherein the second vehicle is in front of the first vehicle; and
   one or more processors, configured to
      determine from at least the sensor data, during first vehicle deceleration, a slack distance between the first vehicle and the second vehicle, the slack distance between the first vehicle and the second vehicle comprises a distance between the first vehicle and the second vehicle following the first vehicle deceleration; and
      when the slack distance is less than a predetermined threshold, to cause the wireless communication circuit to transmit to the second vehicle a slack request message, wherein the slack request message comprises a request for the second vehicle to modify deceleration of the second vehicle to change the slack distance.

2. The slack distribution system of claim 1, wherein the wireless communication circuit comprises:
   a baseband modem, configured to prepare a signal for wireless communication;
   a transceiver, configured to send the signal for wireless communication; and
   an antenna, configured to transmit the signal for wireless communication.

3. The slack distribution system of claim 1, wherein the slack request message comprises a requested slack distance.

4. The slack distribution system of claim 3, wherein the requested slack distance is selected to cause the predicted slack to change from a negative value to zero, from a negative value to a positive value, from a negative value to a value equal to or greater than the predetermined threshold, from zero to a positive value, from zero to a value equal to or greater than the predetermined threshold, or from a value beneath the predetermined threshold to a value equal to or greater than the predetermined threshold.

5. The slack distribution system of claim 1, wherein the one or more processors are configured to trigger the determining of slack distance by at least one of a deceleration of the first vehicle, a deceleration of the second vehicle, a received transmission regarding a deceleration of a third vehicle, or any combination of the foregoing.

6. The slack distribution system of claim 1, wherein the one or more processors are configured to trigger the determining of slack distance by a signal received by a sensor, wherein the one or more sensors are located within the first vehicle.

7. The slack distribution system of claim 1, wherein the one or more processors are configured to trigger the determining of slack distance by a signal received by a sensor, wherein at least one of the one or more sensors are located extravehicularly, and wherein data from the one or more extravehicular sensors is transmitted to the wireless communication circuit and delivered to the one or more processors.

8. The slack distribution system of claim 1, wherein the sensor data comprises a velocity of the first vehicle; an acceleration or deceleration of the first vehicle; a velocity of the second vehicle; an acceleration or deceleration of the second vehicle, a distance between the first vehicle and the second vehicle; or any combination of the foregoing.

9. The slack distribution system of claim 1, wherein the one or more sensors are further configured to receive data corresponding to at least one of a road friction coefficient or a brake friction coefficient and wherein the one or more processors are further configured to determine the slack of the first vehicle relative to the second vehicle using at least the friction data.

10. The slack distribution system of claim 1, wherein the slack request message comprises a request for the second vehicle to modify a braking force to increase the slack between the first vehicle and the second vehicle.

11. A slack distribution system comprising:
a wireless communication circuit, configured to wirelessly receive a slack request message from a first vehicle;
one or more sensors, configured to deliver sensor data to one or more processors in a second vehicle, wherein the second vehicle is in front of the first vehicle;
a brake control unit, configured to modify a braking force; and
one or more processors, configured to
determine at least from the sensor data a slack distance of the second vehicle relative to an obstacle, the slack distance of the second vehicle relative to the obstacle comprises a distance between the second vehicle and the obstacle following deceleration by the second vehicle and the slack request message comprises a request for the second vehicle to modify deceleration of the second vehicle to change the slack distance of the second vehicle; and
when the slack distance relative to the obstacle is greater than a predetermined threshold, to cause the brake control unit to modify the braking force to decrease the slack distance between the second vehicle and the obstacle, in response to the received slack request message.

12. The slack distribution system of claim 11, wherein the wireless communication circuit comprises: a baseband modem, configured to translate a signal for wireless communication; and a transceiver, configured to send or receive the signal for wireless communication using and an antenna.

13. The slack distribution system of claim 11, wherein the one or more processors are configured to, when the slack distance relative to the obstacle is greater than the predetermined threshold, cause the wireless communication circuit to transmit to the first vehicle an acceptance of the slack request message.

14. The slack distribution system of claim 11, wherein the one or more processors are configured to, when the slack distance relative to the obstacle is less than the predetermined threshold, cause the wireless communication circuit to transmit a denial of the slack request message.

15. The slack distribution system of claim 11, wherein the obstacle is a third vehicle, anterior to the second vehicle, and wherein the one or more processors are configured to, when the slack distance relative to the third vehicle is less than the predetermined threshold, cause the wireless communication unit to transmit to the third vehicle a slack request message.

16. The slack distribution system of claim 11, wherein the sensor data comprises a velocity of the second vehicle; an acceleration or deceleration of the second vehicle; a velocity of the second vehicle; an acceleration or deceleration of the first vehicle, a distance between the first vehicle and the second vehicle; or any combination of the foregoing.

17. A slack distribution system comprising:
a first vehicle, the first vehicle comprising:
one or more sensors, configured to deliver sensor data to one or more processors in the first vehicle;
a wireless communication circuit, configured to wirelessly connect to a second vehicle, wherein the second vehicle is in front of the first vehicle; and
one or more processors, configured to determine from at least the sensor data, during first vehicle deceleration, a slack distance between the first vehicle and the second vehicle, the slack distance between the first vehicle and the second vehicle comprises a distance between the first vehicle and the second vehicle following the first vehicle deceleration; and
the second vehicle, the second vehicle comprising:
a wireless communication circuit, configured to wirelessly receive a slack request message from the first vehicle;
one or more sensors, configured to deliver sensor data to one or more processors in the second vehicle;
a brake control unit, configured to modify a braking force; and
one or more processors, configured to determine at least from the sensor data a slack distance of the second vehicle relative to an obstacle, the slack distance of the second vehicle relative to the obstacle comprises a distance between the second vehicle and the obstacle following deceleration by the second vehicle;
when the determined slack distance between the first vehicle and the second vehicle is less than a predetermined threshold, the one or more processors of the first vehicle are further configured to cause the wireless communication circuit to transmit to the second vehicle a slack request message comprising a request for the second vehicle to modify deceleration of the second vehicle to change the slack distance of the second vehicle relative to the obstacle;

and when the determined slack distance between the second vehicle and the obstacle is greater than a predetermined threshold, to cause the brake control unit to modify the braking force to decrease the slack distance of the second vehicle relative to the obstacle, in response to the slack request message.

18. The slack distribution system of claim 17, wherein the slack request message comprises a requested slack distance, and wherein the requested slack distance is selected to cause the predicted slack to change from a negative value to zero, from a negative value to a positive value, from a negative value to a value equal to or greater than the predetermined threshold, from zero to a positive value, from zero to a value equal to or greater than the predetermined threshold, or from a value beneath the predetermined threshold to a value equal to or greater than the predetermined threshold.

19. A method of slack distribution comprising:

delivering sensor data to one or more processors in a first vehicle;

determining from at least the delivered sensor data, during first vehicle deceleration, a slack distance between the first vehicle and a second vehicle, wherein the second vehicle is in front of the first vehicle, the slack distance between the first vehicle and the second vehicle comprises a distance between the first vehicle and the second vehicle following the first vehicle deceleration;

when the determined slack distance between the first vehicle and the second vehicle is less than a predetermined threshold, transmitting to the second vehicle a slack request message;

delivering sensor data to one or more processors in the second vehicle;

determining, at least from the sensor data, a slack distance of the second vehicle relative to an obstacle and the slack request message comprising a request for the second vehicle to modify deceleration of the second vehicle to change the slack distance of the second vehicle relative to the obstacle; and when the determined slack distance of the second vehicle relative to the obstacle is greater than a predetermined threshold, modifying a braking force to decrease the slack distance of the second vehicle relative to the obstacle, in response to the slack request message.

20. The method of slack distribution of claim 19, wherein the slack request message comprises a requested slack distance and wherein the requested slack distance is selected to cause the predicted slack to change from a negative value to zero, from a negative value to a positive value, from a negative value to a value equal to or greater than the predetermined threshold, from zero to a positive value, from zero to a value equal to or greater than the predetermined threshold, or from a value beneath the predetermined threshold to a value equal to or greater than the predetermined threshold.

* * * * *